US012785458B2

(12) United States Patent
Choi et al.

(10) Patent No.: US 12,785,458 B2
(45) Date of Patent: Nov. 3, 2026

(54) WIRELESS POWER TRANSMITTER AND WIRELESS POWER TRANSMISSION METHOD BY WIRELESS POWER TRANSMITTER

(71) Applicant: LG ELECTRONICS INC., Seoul (KR)

(72) Inventors: Jingu Choi, Seoul (KR); Gyunghwan Yook, Seoul (KR); Yongcheol Park, Seoul (KR); Minsoo Lee, Seoul (KR); Jinho Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 962 days.

(21) Appl. No.: 18/005,794

(22) PCT Filed: Jul. 15, 2021

(86) PCT No.: PCT/KR2021/009119
§ 371 (c)(1),
(2) Date: Jan. 17, 2023

(87) PCT Pub. No.: WO2022/015080
PCT Pub. Date: Jan. 20, 2022

(65) Prior Publication Data

US 2023/0344280 A1 Oct. 26, 2023

(30) Foreign Application Priority Data

Jul. 15, 2020 (KR) ........................ 10-2020-0087386

(51) Int. Cl.
*H02J 50/60* (2016.01)
*H02J 13/13* (2026.01)
(Continued)

(52) U.S. Cl.
CPC .......... *H02J 50/80* (2016.02); *H02J 13/1335* (2026.01); *H02J 50/12* (2016.02); *H02J 50/60* (2016.02); *H02J 50/90* (2016.02)

(58) Field of Classification Search
USPC ......................... 320/106, 107, 108, 109, 110
See application file for complete search history.

(56) References Cited

U.S. PATENT DOCUMENTS

2014/0111154 A1 4/2014 Roy et al.
2016/0218520 A1 7/2016 Mehas et al.
(Continued)

FOREIGN PATENT DOCUMENTS

KR 10-2016-0051497 5/2016
KR 10-2018-0074461 7/2018
(Continued)

OTHER PUBLICATIONS

European Patent Office Application Serial No. 21841858.0, Search Report dated Jul. 24, 2024, 7 pages.
(Continued)

*Primary Examiner* — Brian Ngo
(74) *Attorney, Agent, or Firm* — LEE, HONG, DEGERMAN, KANG & WAIMEY

(57) ABSTRACT

A wireless power transmitter according to an embodiment of the present specification comprises: a power converter comprising a primary coil magnetically coupled to a secondary coil of a wireless power receiver to transmit wireless power; and a controller for communicating with the wireless power receiver and controlling the wireless power transmission, wherein the controller receives first information relating to the secondary coil from the wireless power receiver, receives second information relating to the position information of the wireless power receiver from the wireless power receiver, and distinguishes a state in which a foreign material is present between the wireless power receiver and the wireless power transmitter, and a misalignment state of the primary coil and secondary coil, on the basis of the first information and second information.

18 Claims, 25 Drawing Sheets

(51) Int. Cl.

| | |
|---|---|
| ***H02J 50/12*** | (2016.01) |
| ***H02J 50/80*** | (2016.01) |
| ***H02J 50/90*** | (2016.01) |

(56) References Cited

U.S. PATENT DOCUMENTS

| | | | | |
|---|---|---|---|---|
| 2016/0352155 | A1 | 12/2016 | Iwasaki | |
| 2018/0219421 | A1* | 8/2018 | Yang | H02J 50/12 |
| 2019/0103771 | A1* | 4/2019 | Piasecki | H02J 50/60 |
| 2020/0036229 | A1 | 1/2020 | Pinciuc et al. | |
| 2020/0083754 | A1* | 3/2020 | Tian | H04B 5/79 |

FOREIGN PATENT DOCUMENTS

| | | |
|---|---|---|
| KR | 10-2020-0045171 | 5/2020 |
| WO | 2020-085631 | 4/2020 |

OTHER PUBLICATIONS

PCT International Application No. PCT/KR2021/009119, International Search Report dated Oct. 25, 2021, 4 page.

* cited by examiner

FIG. 3b

| | b7 | b6 | b5 | b4 | b3 | b2 | b1 | b0 |
|---|---|---|---|---|---|---|---|---|
| Byte 0 | Application Profile | | | | | | | |
| Byte 1 | Version | | | | | | | |
| Byte 2-N-1 | Profile-specific data | | | | | | | |

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 14

| | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Reserved | | | | | | | |
| $B_2$ | ZERO | AI | Reserved | OB | ZERO | Count | | |
| $B_3$ | Window Size | | | | | Window Offset | | |
| $B_4$ | Neg | Pol | Depth | | Buffer Size | | | Dup |

FIG. 16

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

WIRELESS POWER TRANSMITTER AND WIRELESS POWER TRANSMISSION METHOD BY WIRELESS POWER TRANSMITTER

CROSS-REFERENCE TO RELATED APPLICATION(S)

This application is the National Stage filing under 35 U.S.C. 371 of International Application No. PCT/KR2021/009119, filed on Jul. 15, 2021, which claims the benefit of earlier filing date and right of priority to Korean Application No. 10-2020-0087386, filed on Jul. 15, 2020, the contents of which are all hereby incorporated by reference herein in their entireties.

BACKGROUND OF THE DISCLOSURE

Field of the Disclosure

The present specification relates to a wireless power transmission device providing wireless power, a wireless power transmission method using the wireless power transmission device, and the like.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

A technical problem of the present specification is to provide a wireless power transmission device and a wireless power transmission method for distinguishing between a state in which a foreign substance is present and a misalignment state of a coil.

The technical tasks of the present specification are not limited to the tasks mentioned above, and other tasks not mentioned will be clearly understood by those skilled in the art from the description below.

A wireless power transmitter, which transmits a wireless power to a wireless power receiver, according to an embodiment of the present specification for solving the above problems comprises a power converter including a primary coil that is magnetically coupled to a secondary coil of the wireless power receiver and transmits the wireless power and a controller configured to communicate with the wireless power receiver and control the transmission of the wireless power, wherein the controller is configured to receive first information related to the secondary coil from the wireless power receiver, receive second information related to location information of the wireless power receiver from the wireless power receiver, distinguish a state in which a foreign object exists between the wireless power receiver and the wireless power transmitter and a misalignment state between the primary coil and the secondary coil, based on the first information and the second information.

A method for transmitting wireless power to a wireless power receiver according to an embodiment of the present specification for solving the above problems is performed by a wireless power transmitter and comprises, wherein the wireless power transmitter includes a primary coil that is magnetically coupled to a secondary coil of the wireless power receiver and transmits the wireless power, receiving first information related to the secondary coil from the wireless power receiver, receiving second information related to a location change of the wireless power receiver from the wireless power receiver and distinguishing a state in which a foreign object exists between the wireless power receiver and the wireless power transmitter and a misalignment state between the primary coil and the secondary coil, based on the first information and the second information.

Other specific details of this specification are included in the detailed description and drawings.

It is possible to distinguish the state in which a foreign object exists and the misalignment state of the coil, and control wireless power according to the distinguished state.

The effect according to the present document is not limited by the contents exemplified above, and more various effects are included in the present specification.

BRIEF DESCRIPTION OF THE DRAWINGS

FIG. 3*b* shows an example of a WPC NDEF in a wireless power transfer system.

FIG. 14 is a diagram illustrating a message field of a configuration packet (CFG) of a wireless power receiver according to an embodiment.

FIG. 16 is a diagram illustrating a message field of a capability packet (CAP) of a wireless power transmitter according to an embodiment.

DESCRIPTION OF EXEMPLARY EMBODIMENTS

In this specification, “A or B” may refer to “only A”, “only B” or “both A and B”. In other words, “A or B” in this specification may be interpreted as “A and/or B”. For example, in this specification, “A, B, or C” may refer to “only A”, “only B”, “only C”, or any combination of “A, B and C”.

The slash (/) or comma used in this specification may refer to “and/or”. For example, “A/B” may refer to “A and/or B”. Accordingly, “A/B” may refer to “only A”, “only B”, or “both A and B”. For example, “A, B, C” may refer to “A, B, or C”.

In this specification, “at least one of A and B” may refer to “only A”, “only B”, or “both A and B”. In addition, in this specification, the expression of “at least one of A or B” or “at least one of A and/or B” may be interpreted to be the same as “at least one of A and B”.

Also, in this specification, “at least one of A, B and C” may refer to “only A”, “only B”, “only C”, or “any combination of A, B and C”. Also, “at least one of A, B or C” or “at least one of A, B and/or C” may refer to “at least one of A, B and C”.

In addition, parentheses used in the present specification may refer to “for example”. Specifically, when indicated as “control information (PDCCH)”, “PDCCH” may be proposed as an example of “control information”. In other words, “control information” in this specification is not limited to “PDCCH”, and “PDDCH” may be proposed as an example of “control information”. In addition, even when indicated as “control information (i.e., PDCCH)”, “PDCCH” may be proposed as an example of “control information”.

In the present specification, technical features that are individually described in one drawing may be individually or simultaneously implemented. The term “wireless power”, which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
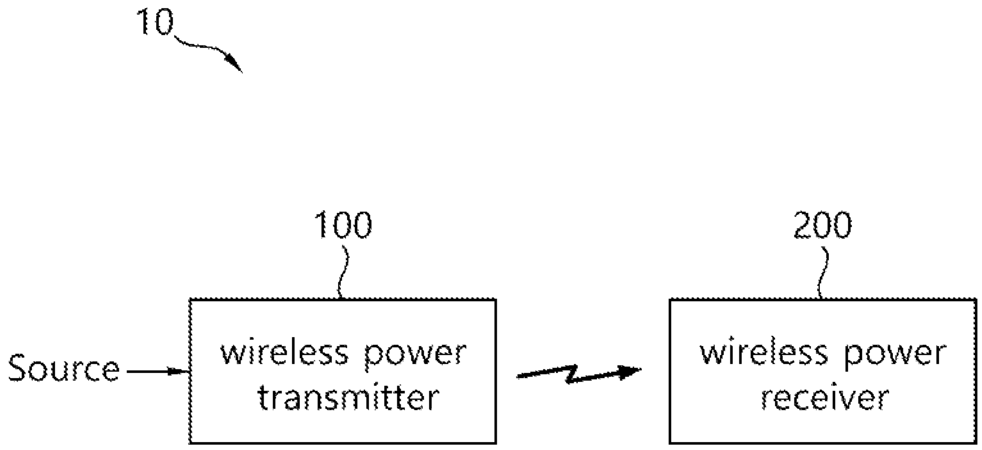
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
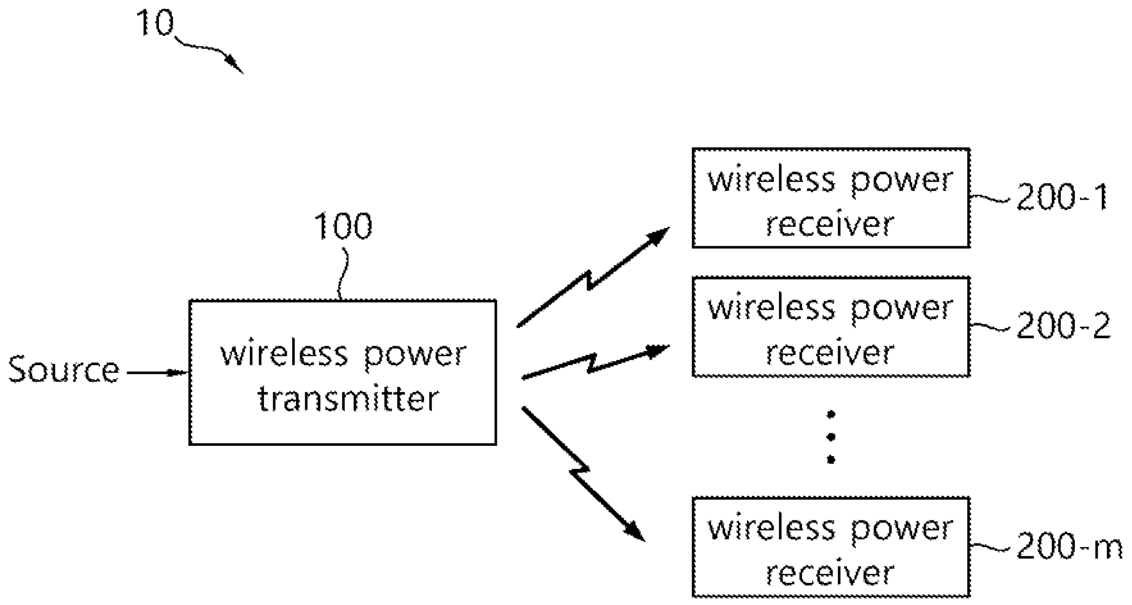
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
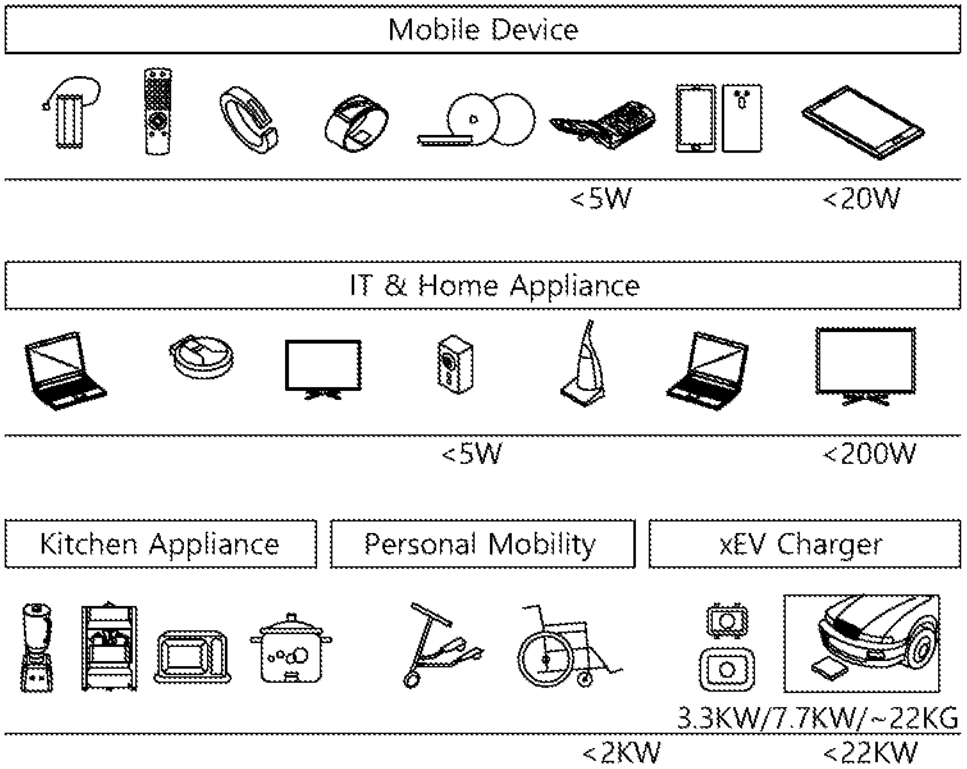
FIG. 3*a* shows an exemplary embodiment of diverse electronic devices adopting a wireless power transfer system.

FIG. 3*a* shows an exemplary embodiment of diverse electronic devices adopting a wireless power transfer system.

As shown in FIG. 3*a*, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (TB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3*b* shows an example of a WPC NDEF in a wireless power transfer system.

Referring to FIG. 3*b*, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2W | 1x Category 1 | 1x Category 1 |
| Class 2 | 10W | 1x Category 3 | 2x Category 2 |
| Class 3 | 16W | 1x Category 4 | 2x Category 3 |
| Class 4 | 33W | 1x Category 5 | 3x Category 3 |
| Class 5 | 50W | 1x Category 6 | 4x Category 3 |
| Class 6 | 70W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5W | Feature phone |
| Category 3 | 6.5W | Smartphone |
| Category 4 | 13W | Tablet PC, Phablet |
| Category 5 | 25W | Small form factor laptop |
| Category 6 | 37.5W | General laptop |
| Category 7 | 50W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
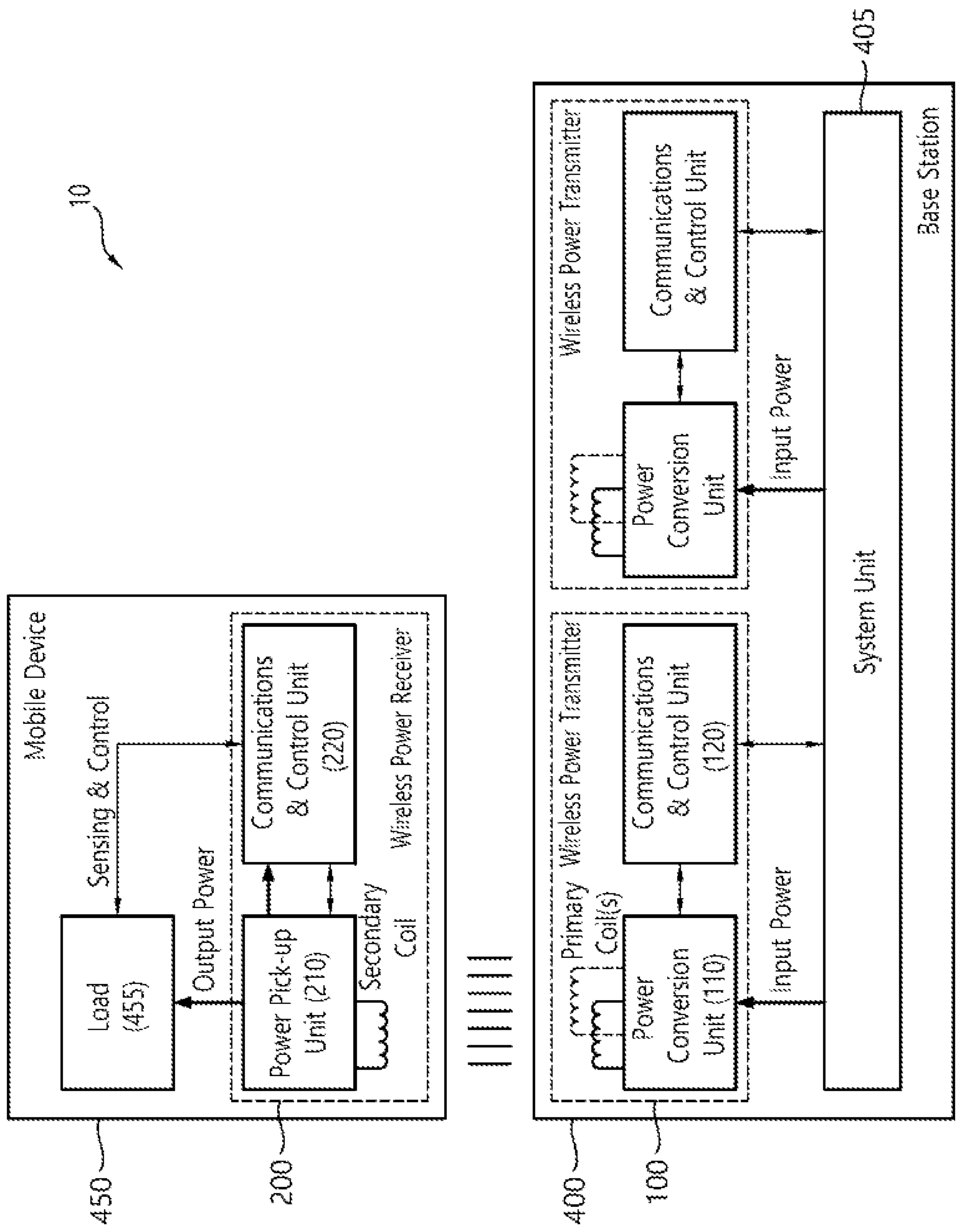
FIG. 4*a* is a block diagram of a wireless power transfer system according to another exemplary embodiment of the present disclosure.

FIG. 4*a* is a block diagram of a wireless power transfer system according to another exemplary embodiment of the present disclosure.

Referring to FIG. 4*a*, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120)

may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4*a*, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
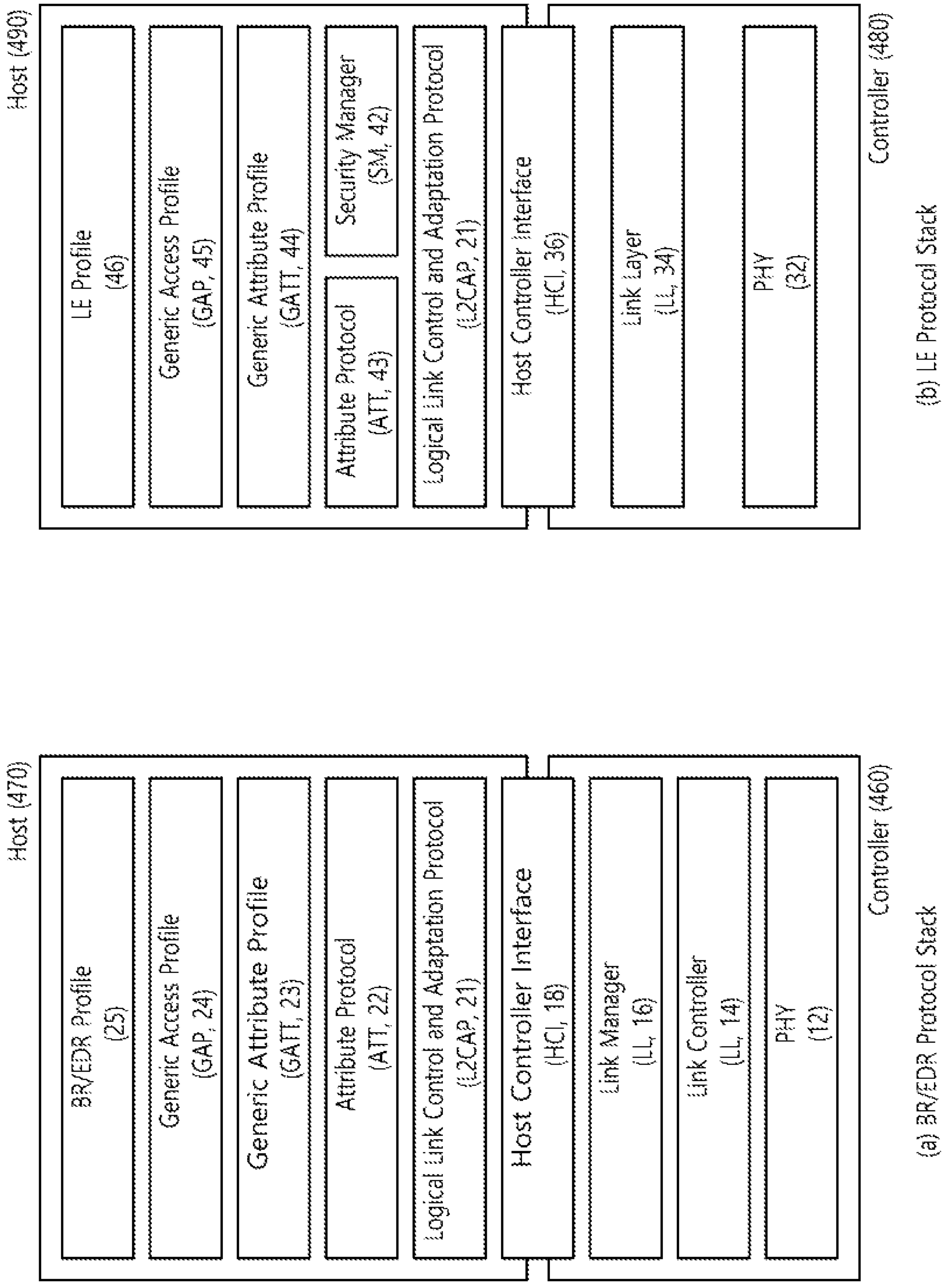
FIG. 4*b* is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4*b*.

FIG. 4*b* is a diagram illustrating an example of a Bluetooth communication architecture to which an embodiment according to the present disclosure may be applied.

Referring to FIG. 4*b*, (a) of FIG. 4*b* shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4*b*, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4*b*, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GF SK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4*a*, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
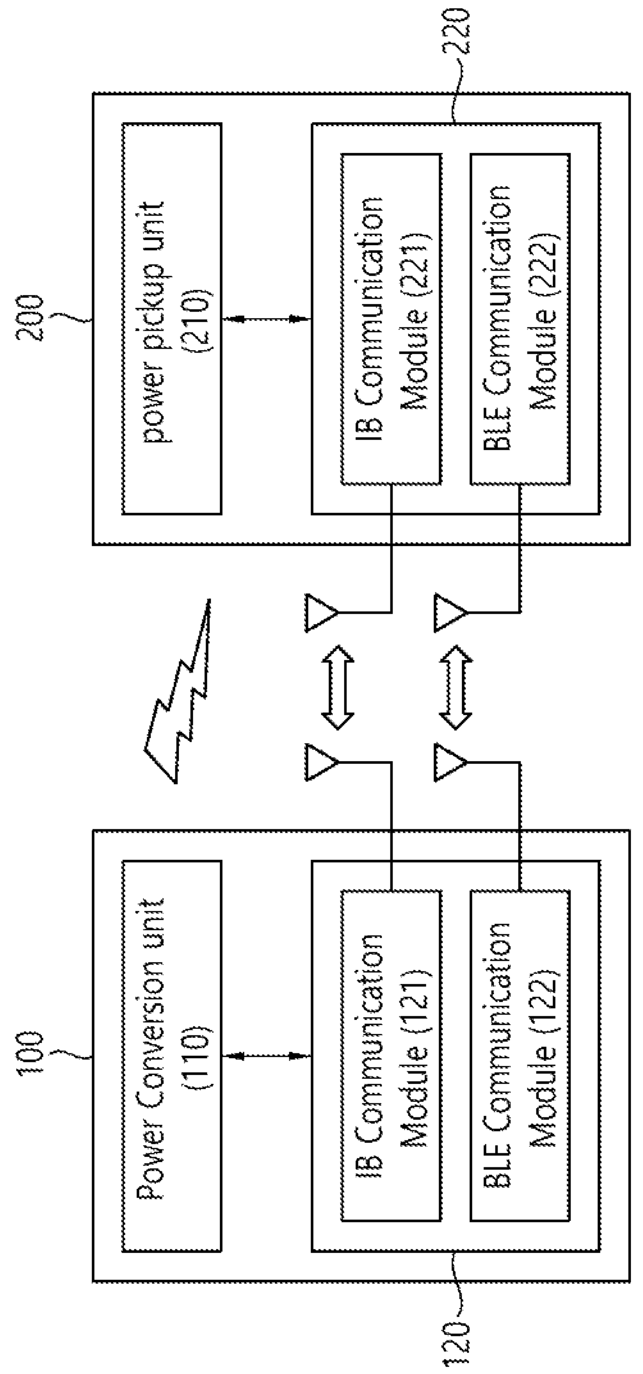
FIG. 4*c* is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4*c*.

FIG. 4*c* is a block diagram illustrating a wireless power transfer system using BLE communication according to an example.

Referring to FIG. 4*c*, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4*b*. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
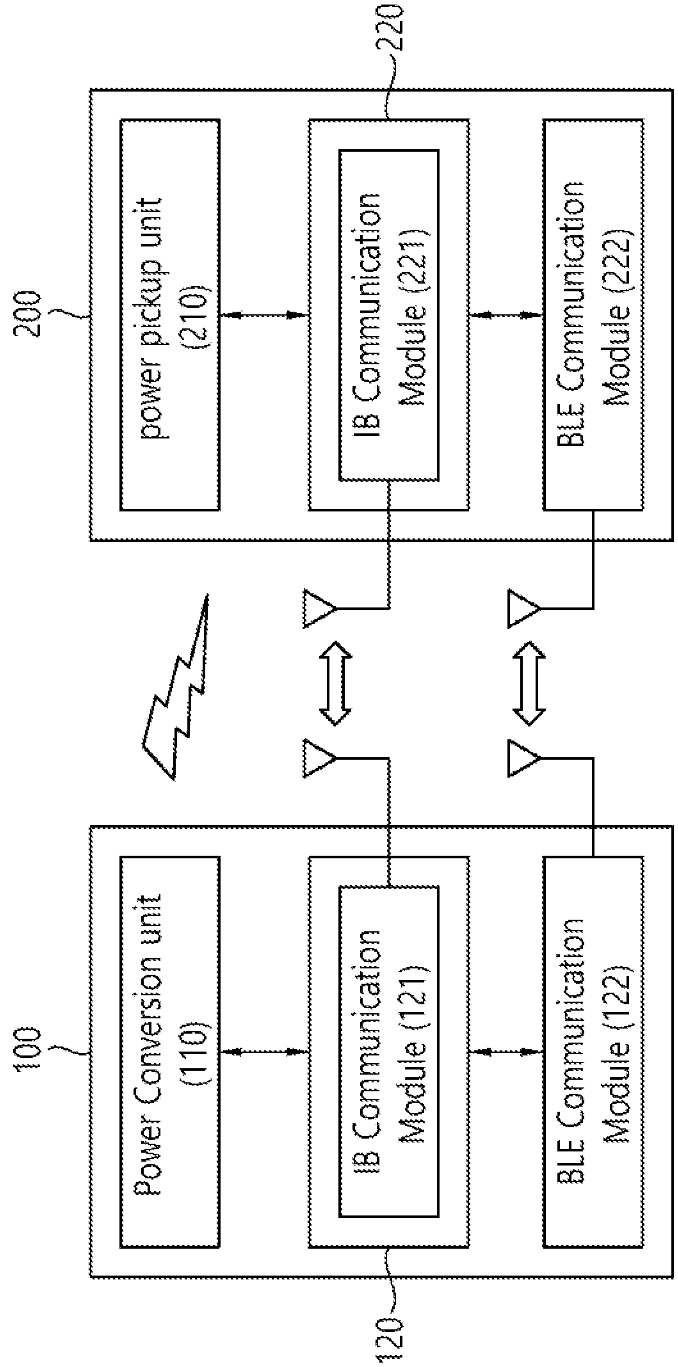
FIG. 4*d* is a block diagram illustrating a wireless power transfer system using BLE communication according to another example.

FIG. 4*d* is a block diagram illustrating a wireless power transfer system using BLE communication according to another example.

Referring to FIG. 4*d*, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
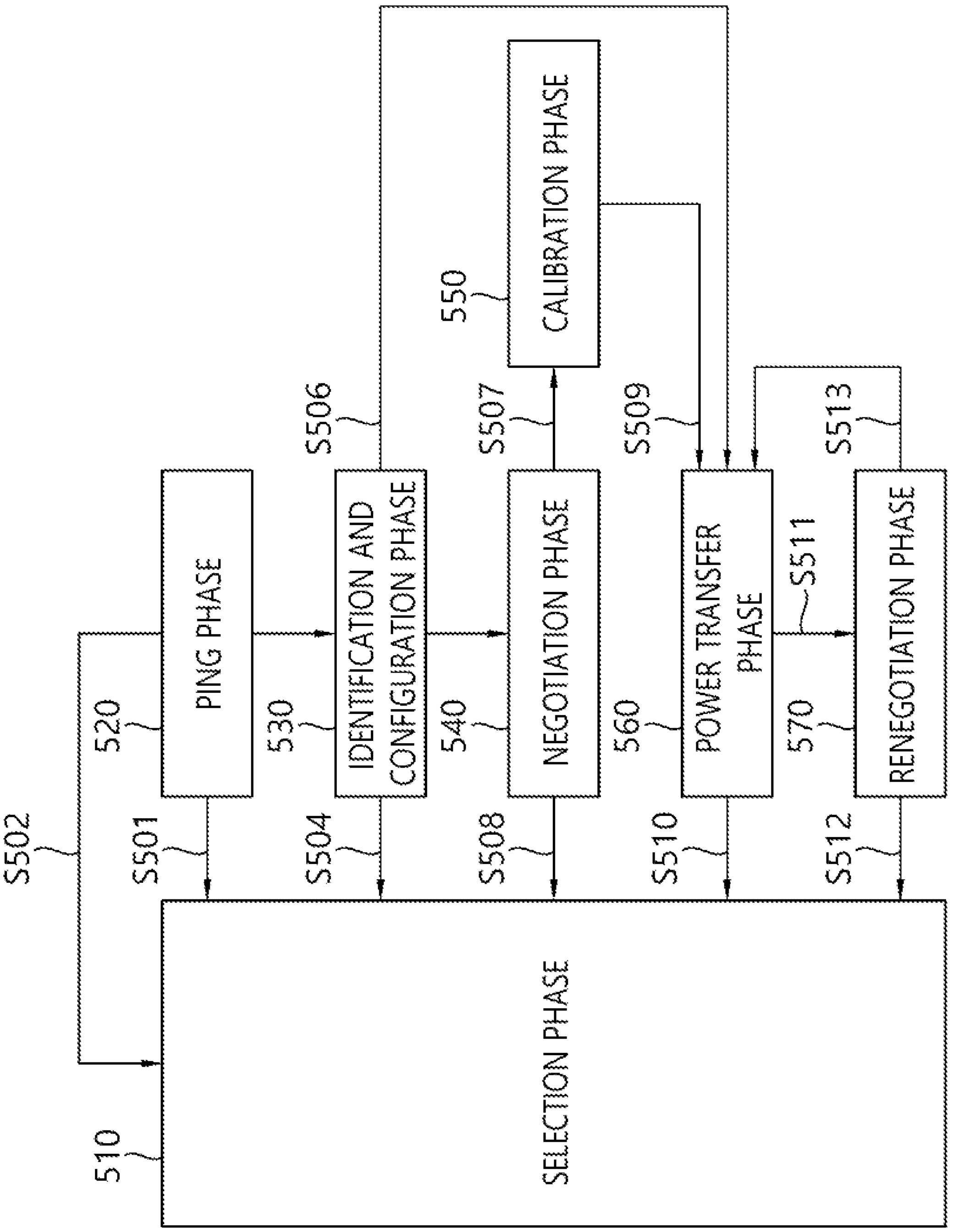
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
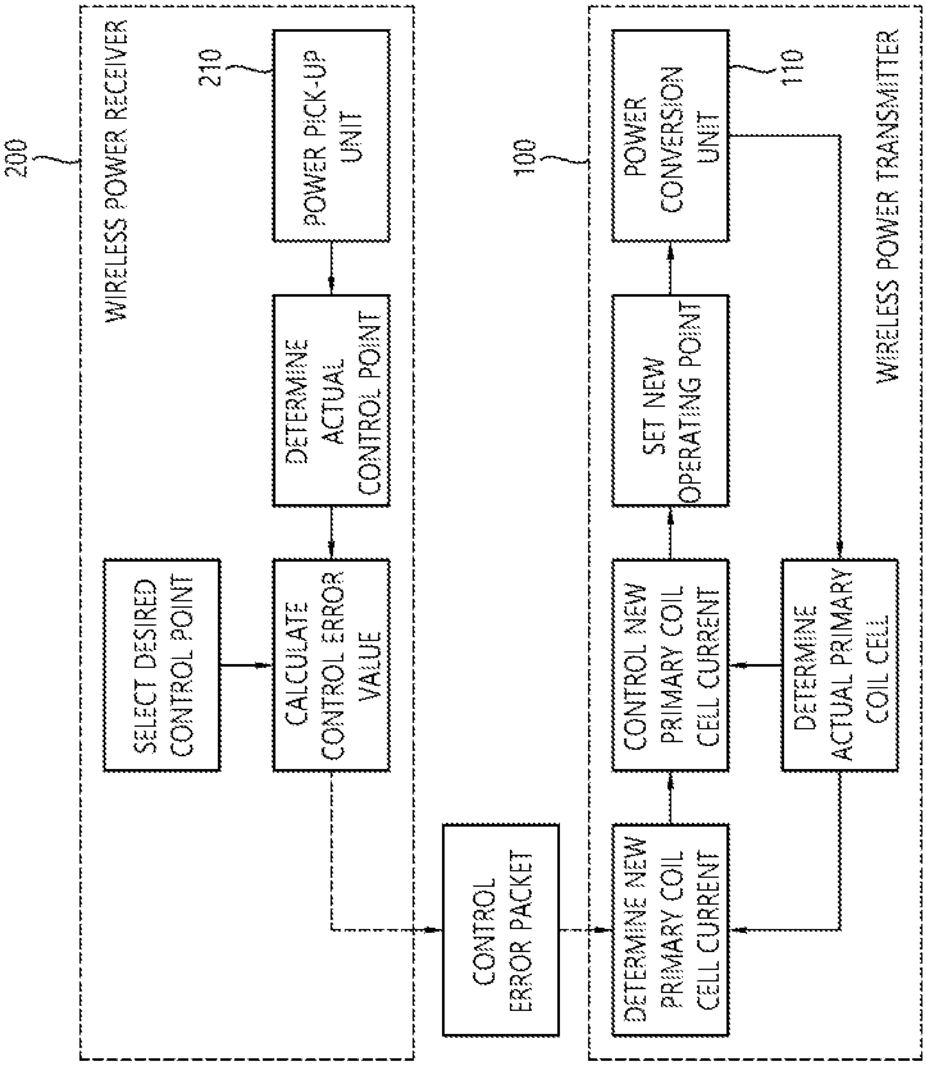
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
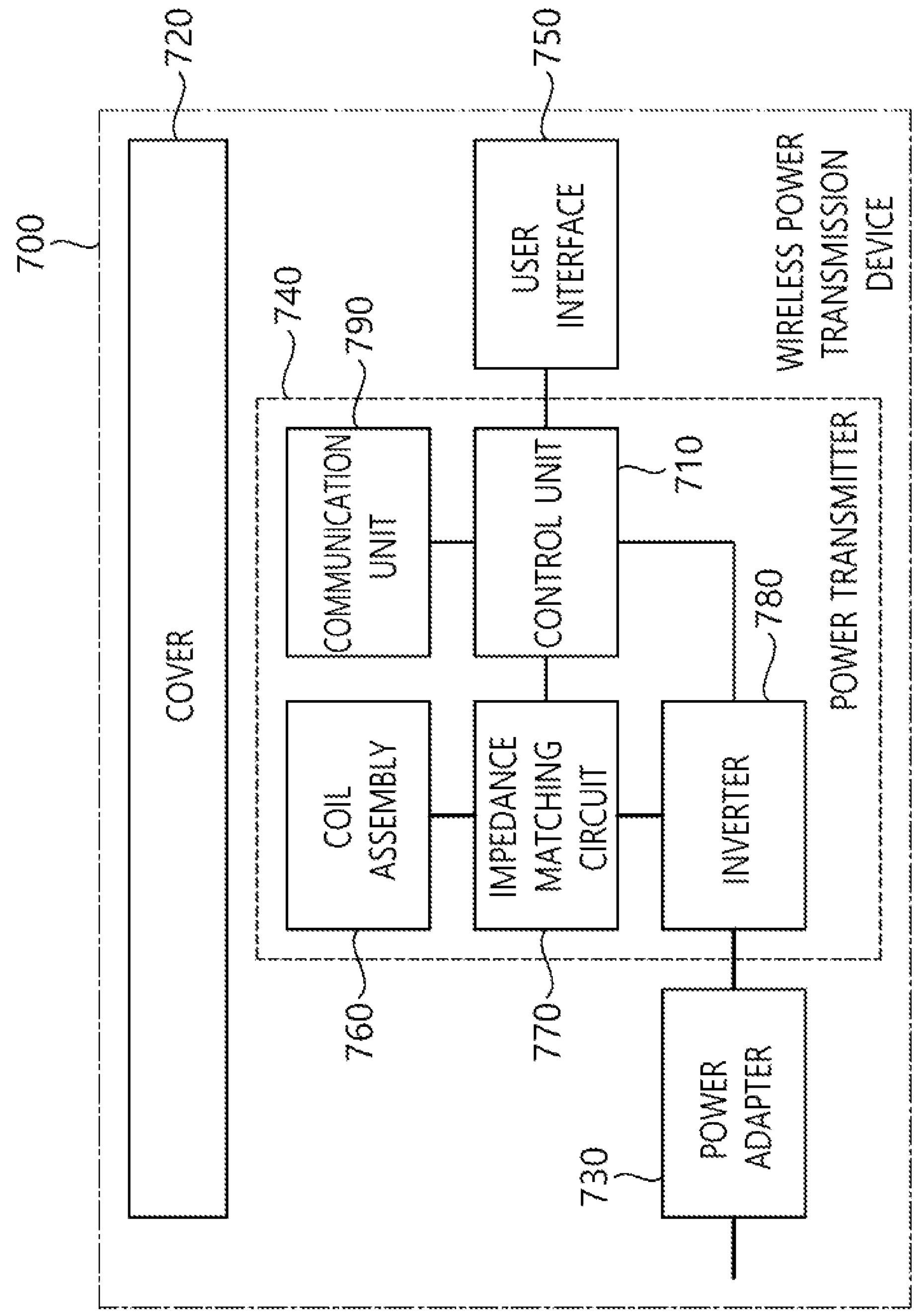
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
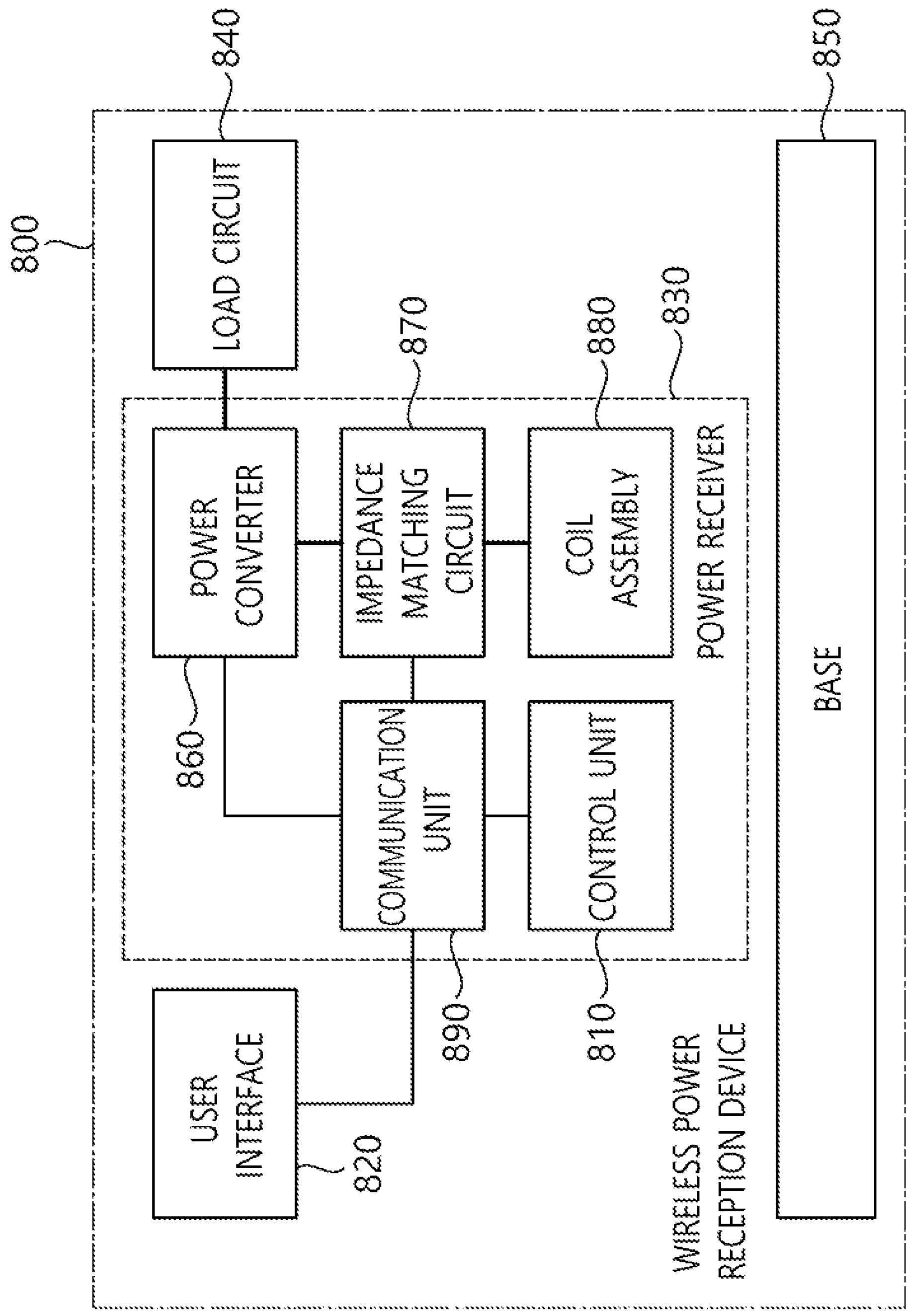
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
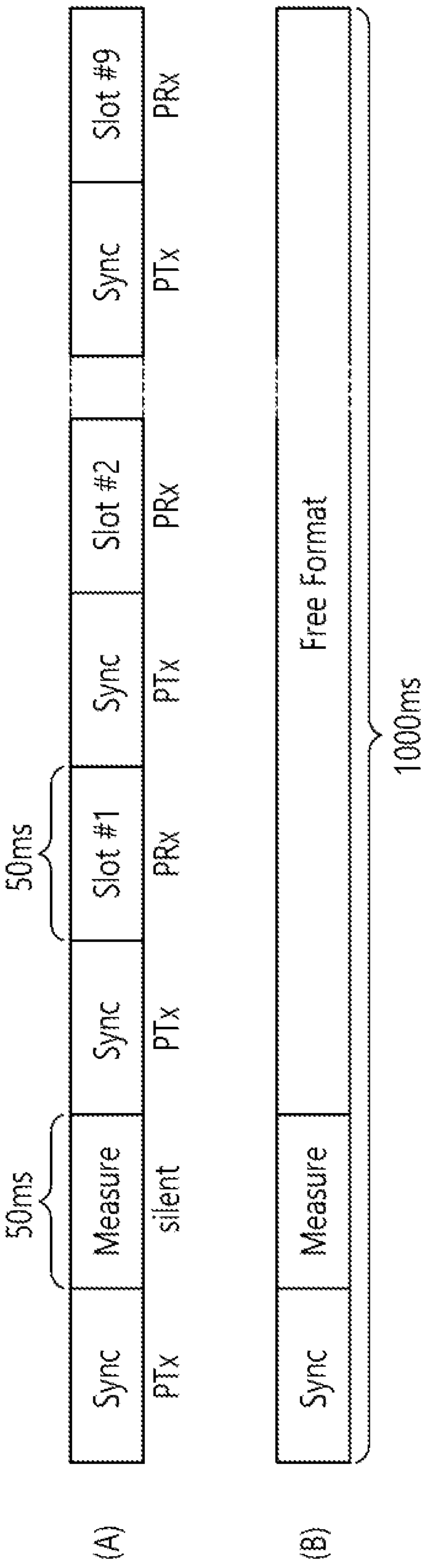
FIG. 9 shows a communication frame structure according to an embodiment. This may be a communication frame structure in a shared mode.

FIG. 9 shows a communication frame structure according to an embodiment. This may be a communication frame structure in a shared mode.

Referring to FIG. 9, in the shared mode, different types of frames may be used together. For example, in the shared mode, a slotted frame having a plurality of slots as shown in (A) and a free format frame having no specific shape as shown in (B) may be used. More specifically, the slot frame is a frame for transmitting short data packets from the wireless power receiver 200 to the wireless power transmitter 100, since the free-form frame does not have a plurality of slots, it may be a frame in which long data packets can be transmitted.

Meanwhile, the slot frame and the free-form frame may be changed to various names by those skilled in the art. For example, a slot frame may be changed to a channel frame, a free-form frame may be changed to a message frame, and the like.

More specifically, the slot frame may include a sync pattern indicating the start of a slot, a measurement slot, 9 slots, and an additional sync pattern having the same time interval prior to each of the 9 slots.

Here, the additional sync pattern is a sync pattern different from the sync pattern indicating the start of the frame described above. More specifically, the additional sync pattern may not indicate the start of a frame, but may indicate information related to adjacent slots (i.e., two consecutive slots located on both sides of the sync pattern).

A sync pattern may be positioned between two consecutive slots among the nine slots. In this case, the sync pattern may provide information related to the two consecutive slots.

Also, the nine slots and the sync patterns provided prior to each of the nine slots may have the same time interval. For example, the nine slots may have a time interval of 50 ms. Also, the nine sync patterns may have a time length of 50 ms.

Meanwhile, a free-form frame as shown in (B) may not have a specific shape other than a sync pattern indicating the start of the frame and a measurement slot. That is, the free-form frame is for performing a different role from the slot frame, for example, performing communication of long data packets (e.g., additional owner information packets) between the wireless power transmitter and the wireless power receiver, or in the wireless power transmitter consisting of a plurality of coils, it may be used for a role of selecting any one of the plurality of coils.

Hereinafter, a sync pattern included in each frame will be described in more detail with drawings.

Figure 10:
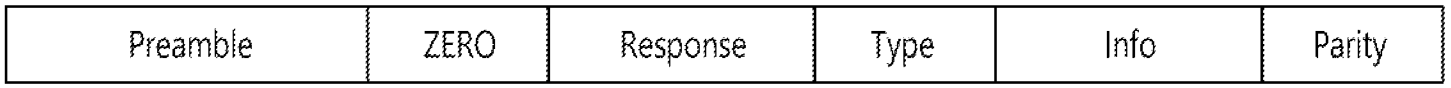
FIG. 10 is a structure of a sync pattern according to an exemplary embodiment.

FIG. 10 is a structure of a sync pattern according to an exemplary embodiment.

Referring to FIG. 10, the sync pattern can be composed of preamble, start bit, response field, type field, info field and parity bit. In FIG. 10, the start bit is shown as ZERO.

More specifically, the preamble consists of consecutive bits, and all of them may be set to 0. That is, the preamble may be bits for matching the time length of the sync pattern.

The number of bits constituting the preamble may depend on the operating frequency so that the length of the sync pattern is closest to 50 ms, but within a range that does not exceed 50 ms. For example, when the operating frequency is 100 kHz, the sync pattern may be composed of two preamble bits, and when the operating frequency is 105 kHz, the sync pattern may be composed of three preamble bits.

The start bit is a bit following the preamble and may mean ZERO. The zero may be a bit indicating the type of the sync pattern. Here, the types of sync patterns may include frame sync including frame-related information and slot sync including slot information. That is, the sync pattern is located between successive frames, it is a frame sync indicating the start of a frame, or located between consecutive slots among a plurality of slots constituting a frame, it may be a slot sink including information related to the successive slots.

For example, when the zero is 0, it means that the corresponding slot is slot sync located between the slots, and when it is 1, it can mean that the corresponding sync pattern is frame sync located between the frames.

The parity bit is the last bit of the sync pattern and may indicate information on the number of bits constituting the data fields (i.e., the response field, the type field, and the information field) of the sync pattern. For example, the previous parity bit may be 1 when the number of bits constituting the data fields of the sync pattern is an even number, and 0 in other cases (i.e., an odd number).

The response field may include response information of the wireless power transmitter for communication with the wireless power receiver in a slot before the sync pattern. For example, the response field may have ‘00’ when communication with the wireless power receiver is not detected. Also, the response field may have ‘01’ when a communication error is detected in communication with the wireless power receiver. The communication error may be a case in which two or more wireless power receivers attempt to access one slot, and a collision occurs between two or more wireless power receivers.

Also, the response field may include information indicating whether a data packet has been correctly received from the wireless power receiver. More specifically, when the wireless power transmitter denies the data packet, the response field may be “10” (10—not acknowledge, NAK), when the wireless power transmitter confirms the data packet, it may be “11” (11—acknowledge, ACK).

The type field may indicate the type of the sync pattern. More specifically, the type field may have ‘1’ indicating frame sync when the sync pattern is the first sync pattern of the frame (i.e., the first sync pattern of the frame, which is located before the measurement slot).

Also, in the slot frame, when the sync pattern is not the first sync pattern of the frame, the type field may have ‘0’ indicating slot sync.

Also, the meaning of the value of the information field may be determined according to the type of the sync pattern indicated by the type field. For example, when the type field is 1 (i.e., indicating frame sync), the meaning of the information field may indicate the type of frame. That is, the information field may indicate whether the current frame is a slotted frame or a free-format frame. For example, when the information field is ‘00’, it may indicate a slot frame, and when the information field is ‘01’, it may indicate a free-form frame.

On the other hand, when the type field is 0 (i.e., slot sync), the information field may indicate the state of the next slot located after the sync pattern. More specifically, when the next slot is a slot allocated to a specific wireless power receiver, the information field has ‘00’, in the case of a locked slot for a specific wireless power receiver to use temporarily, it has ‘01’, alternatively, when any wireless power receiver is a freely usable slot, it may have ‘10’.

Figure 11:
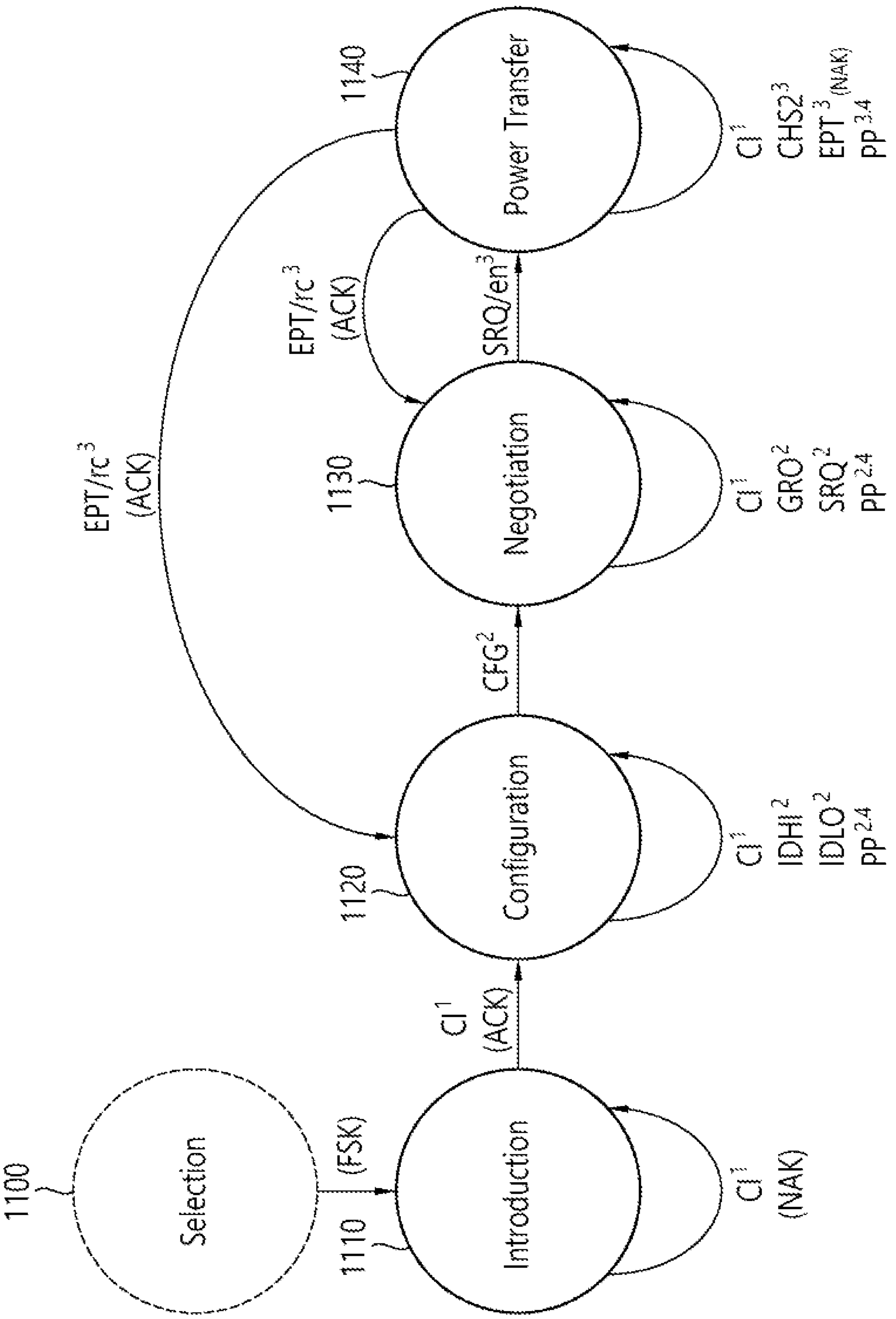
FIG. 11 illustrates operation states of a wireless power transmitter and a wireless power receiver in a shared mode according to an embodiment.

FIG. 11 illustrates operation states of a wireless power transmitter and a wireless power receiver in a shared mode according to an embodiment.

Referring to FIG. 11, a wireless power receiver operating in shared mode, it can operate in any one of the states of Selection Phase (1100), Introduction Phase 1110, Configuration Phase (1120), Negotiation Phase 1130 and Power Transfer Phase (1140).

First, the wireless power transmitter according to an embodiment may transmit a wireless power signal to detect the wireless power receiver. That is, the process of detecting the wireless power receiver using the wireless power signal may be referred to as analog ping.

Meanwhile, the wireless power receiver receiving the wireless power signal may enter the selection phase 1100. As described above, the wireless power receiver entering the selection phase 1100 may detect the presence of an FSK signal on the wireless power signal.

That is, the wireless power receiver may perform communication in either the exclusive mode or the shared mode according to the presence of the FSK signal.

More specifically, the wireless power receiver operates in a shared mode when the FSK signal is included in the wireless power signal, otherwise, it can operate in exclusive mode.

When the wireless power receiver operates in the shared mode, the wireless power receiver may enter an introduction phase 1110. In order to transmit a control information packet (CI, Control Information packet) in the configuration phase, negotiation phase and power transfer phase, in the introduction phase 1110, the wireless power receiver may transmit a control information packet to the wireless power transmitter. The control information packet may have a header and control-related information. For example, the control information packet may have a header of 0X53.

In the introduction phase 1110, the wireless power receiver attempts to request a free slot to transmit a control information (CI) packet over the following configuration, negotiation, and power transfer phases. At this time, the wireless power receiver selects a free slot and transmits the first CI packet. If the wireless power transmitter responds with ACK to the CI packet, the wireless power transmitter enters the configuration phase. If the wireless power transmitter responds with NAK, another wireless power receiver is in the process of configuring and negotiating. In this case, the wireless power receiver retries the request for a free slot.

If the wireless power receiver receives an ACK in response to the CI packet, the wireless power receiver determines the position of a private slot in the frame by counting the remaining slot sinks up to the first frame sink. In all subsequent slot-based frames, the wireless power receiver transmits the CI packet through the corresponding slot.

If the wireless power transmitter allows the wireless power receiver to proceed to the configuration phase, the wireless power transmitter provides a series of locked slots for exclusive use of the wireless power receiver. This ensures that the wireless power receiver proceeds through the configuration phase without conflicts.

The wireless power receiver transmits sequences of data packets such as two identification data packets (IDHI and IDLO) using a lock slot. After completing this step, the wireless power receiver enters the negotiation phase. In the negotiation phase, the wireless power transmitter continues to provide a lock slot for exclusive use to the wireless power receiver. This ensures that the wireless power receiver proceeds with the negotiation phase without collision.

The wireless power receiver transmits one or more negotiation data packets using the corresponding lock slot, it may be mixed with private data packets. Eventually, the sequence ends with a specific request (SRQ) packet. When the sequence is complete, the wireless power receiver enters the power transmission phase, and the wireless power transmitter stops providing the lock slot.

In the power transfer phase, the wireless power receiver transmits the CI packet using the allocated slot and receives power. The wireless power receiver may include a regulator circuit. The regulator circuit may be included in the communication/control circuit. The wireless power receiver may self-regulate the reflection impedance of the wireless power receiver through a regulator circuit. In other words, the wireless power receiver may adjust the reflected impedance in order to transmit the amount of power required by the external load. This can prevent excessive power reception and overheating.

In the shared mode, since the wireless power transmitter may not perform power adjustment in response to the received CI packet (according to the operation mode), in this case, control to prevent an overvoltage state may be required.

As described in FIGS. 5 and 11, etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 12:
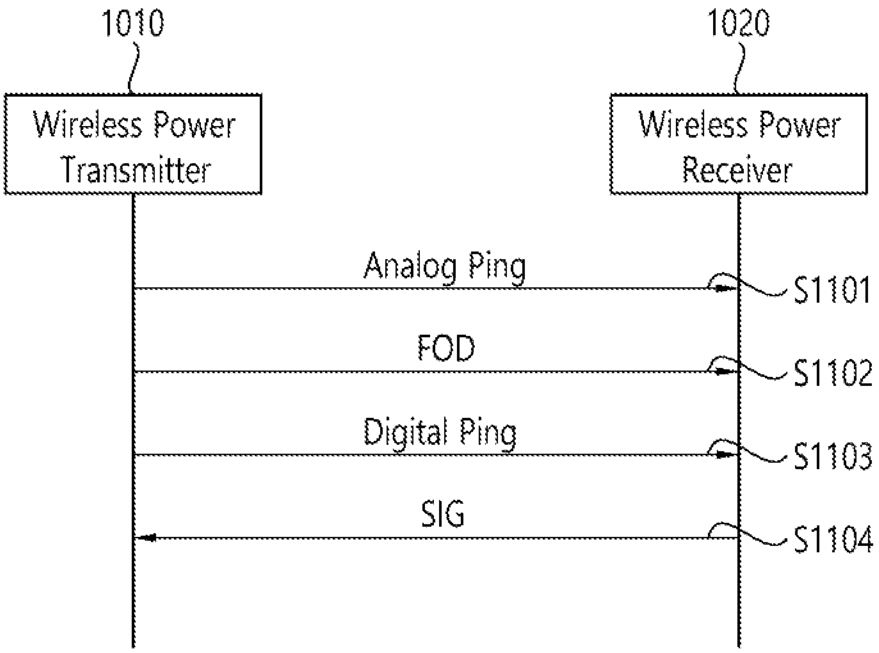
FIG. 12 is a flowchart schematically illustrating a protocol of a ping phase according to an embodiment.

FIG. 12 is a flowchart schematically illustrating a protocol of a ping phase according to an embodiment.

Referring to FIG. 12, in the ping phase, the wireless power transmitter 1010 checks whether an object exists in an operating volume by transmitting an analog ping (S1101). The wireless power transmitter 1010 may detect whether an object exists in the working space based on a change in current of a transmission coil or a primary coil.

If it is determined that an object exists in the operating volume by analog ping, the wireless power transmitter 1010 may perform foreign object detection (FOD) before power transmission to check whether a foreign object exists in the operating volume (S1102). The wireless power transmitter 1010 may perform an operation for protecting the NFC card and/or the RFID tag.

Thereafter, the wireless power transmitter 1010 identifies the wireless power receiver 1020 by transmitting a digital ping (S1103). The wireless power receiver 1020 recognizes the wireless power transmitter 1010 by receiving the digital ping.

The wireless power receiver 1020 that has received the digital ping transmits a signal strength data packet (SIG) to the wireless power transmitter 1010 (S1104).

The wireless power transmitter 1010 receiving the SIG from the wireless power receiver 1020 may identify that the wireless power receiver 1020 is located in the operating volume.

Figure 13:
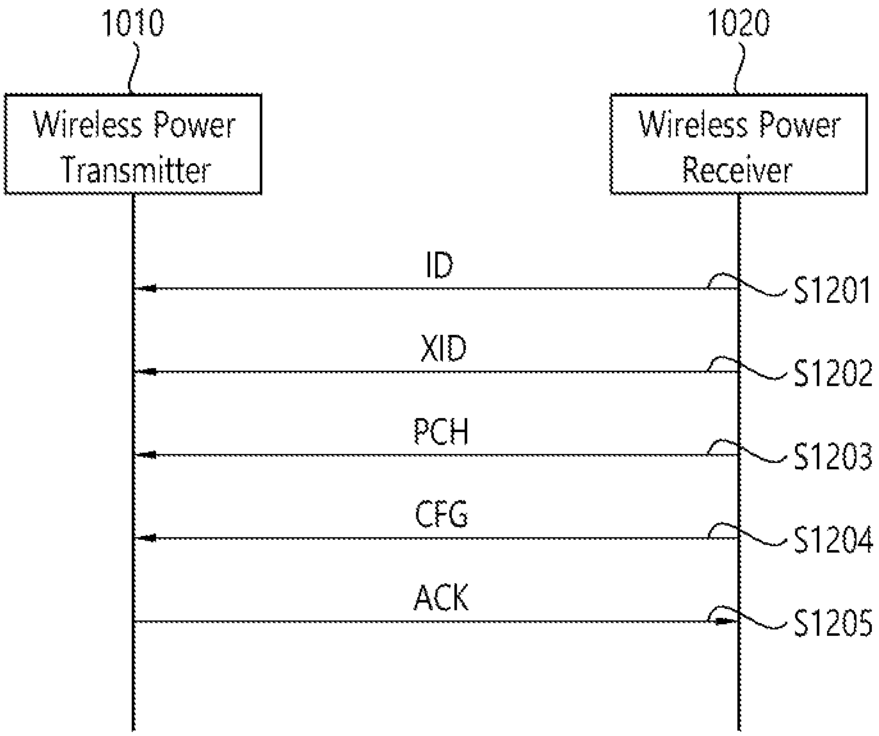
FIG. 13 is a flowchart schematically illustrating a protocol of a configuration phase according to an embodiment.

FIG. 13 is a flowchart schematically illustrating a protocol of a configuration phase according to an embodiment.

In the configuration phase (or identification and configuration phase), the wireless power receiver 1020 transmits its identification information and configuration information to the wireless power transmitter 1010, the wireless power receiver 1020 and the wireless power transmitter 1010 may establish a baseline Power Transfer Contract.

Referring to FIG. 13, in the configuration phase, the wireless power receiver 1020 may transmit an identification data packet (ID) to the wireless power transmitter 1010 to identify itself (S1201). In addition, the wireless power receiver 1020 may transmit an XID (Extended Identification data packet) to the wireless power transmitter 1010 (S1202). In addition, the wireless power receiver 1020 may transmit a power control hold-off data packet (PCH) to the wireless power transmitter 1010 for a power transfer contract (S1203). In addition, the wireless power receiver 1020 may transmit a configuration data packet (CFG) to the wireless power transmitter for a power transfer contract (S1204).

In accordance with the Extended Protocol, the wireless power transmitter 1010 may transmit an ACK in response to the CFG (S1205).

FIG. 14 is a diagram illustrating a message field of a configuration packet (CFG) of a wireless power receiver according to an embodiment.

A configuration packet (CFG) according to an embodiment may have a header value of 0x51 and may include a message field of 5 bytes, referring to FIG. 14.

Referring to FIG. 14, the message field of the configuration packet CFG may include a 1-bit authentication (AI) flag, a 1-bit out-of-band (OB) flag, and a 1-bit ML flag.

The authentication flag AI indicates whether the wireless power receiver 1020 supports the authentication function. For example, if the value of the authentication flag AI is '1', it indicates that the wireless power receiver 1020 supports an authentication function or operates as an authentication initiator, if the value of the authentication flag AI is '0', it may indicate that the wireless power receiver 1020 does not support an authentication function or cannot operate as an authentication initiator.

The out-band (OB) flag indicates whether the wireless power receiver 1020 supports out-band communication. For example, if the value of the out-band (OB) flag is '1', the wireless power receiver 1020 instructs out-band communication, if the value of the out-band (OB) flag is '0', it may indicate that the wireless power receiver 1020 does not support out-band communication.

In the configuration phase, the wireless power transmitter 1010 may receive the configuration packet (CFG) of the wireless power receiver 1020 and check whether the wireless power receiver 1020 supports an authentication function and supports out-of-band communication.

Figure 15:
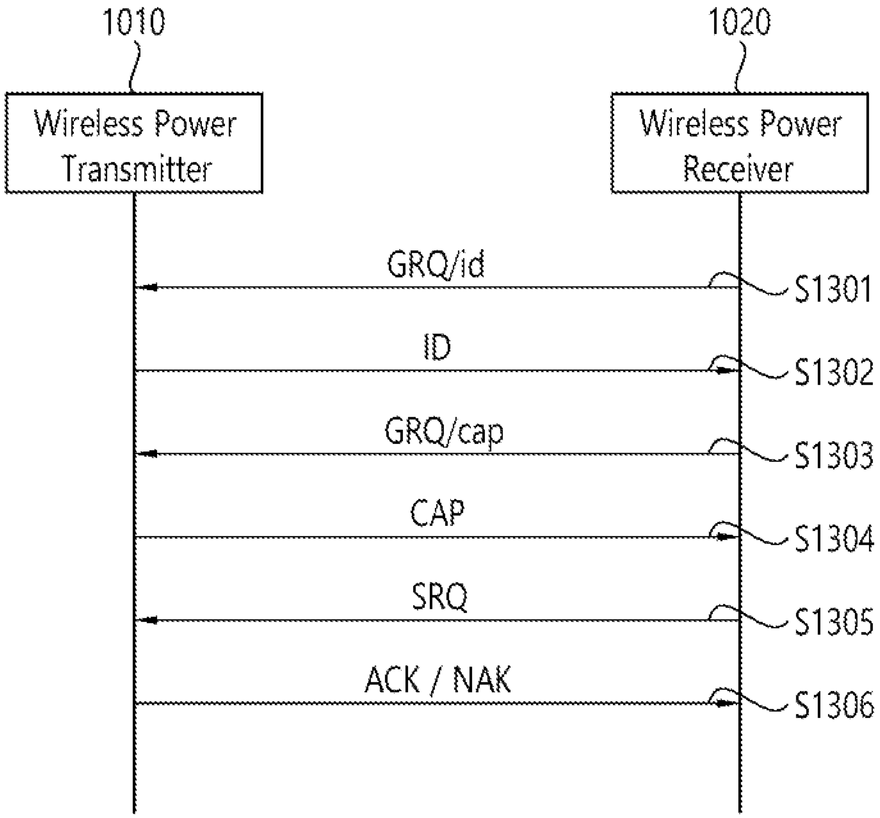
FIG. 15 is a flowchart schematically illustrating a protocol of a negotiation step or a renegotiation step according to an embodiment.

FIG. 15 is a flowchart schematically illustrating a protocol of a negotiation step or a renegotiation step according to an embodiment.

In the negotiation phase or renegotiation phase, the power transfer contract related to the reception/transmission of wireless power between the wireless power receiver and the wireless power transmitter is expanded or changed, or a renewal of the power transfer contract is made that adjusts at least some of the elements of the power transfer contract, or exchange of information for establishing out-band communication may be performed.

Referring to FIG. 15, in the negotiation phase, the wireless power receiver 1020 may receive an identification data packet (ID) and a capabilities data packet (CAP) of the wireless power transmitter 1010 using a general request data packet (GRQ).

The general request packet (GRQ) may have a header value of 0x07 and may include a 1-byte message field. The message field of the general request packet (GRQ) may include a header value of a data packet that the wireless power receiver 1020 requests from the wireless power transmitter 1010 using the GRQ packet. For example, when the wireless power receiver 1020 requests an ID packet of the wireless power transmitter 1010 using a GRQ packet, the wireless power receiver 1020 transmits a general request packet (GRQ/id) including a header value (0x30) of the ID packet of the wireless power transmitter 1010 in the message field of the general request packet (GRQ).

Referring to FIG. 15, in the negotiation phase or renegotiation phase, the wireless power receiver 1020 may transmit a GRQ packet (GRQ/id) requesting the ID packet of the wireless power transmitter 1010 to the wireless power transmitter 1010 (S1301).

The wireless power transmitter 1010 receiving the GRQ/id may transmit the ID packet to the wireless power receiver 1020 (S1302). The ID packet of the wireless power transmitter 1010 includes information on the Manufacturer Code. The ID packet including information on the Manufacturer Code allows the manufacturer of the wireless power transmitter 1010 to be identified.

Referring to FIG. 15, in the negotiation phase or renegotiation phase, the wireless power receiver 1020 may transmit a GRQ packet (GRQ/cap) requesting a capability packet (CAP) of the wireless power transmitter 1010 to the wireless power transmitter 1010 (S1303). The message field of the GRQ/cap may include a header value (0x31) of the capability packet (CAP).

The wireless power transmitter 1010 receiving the GRQ/cap may transmit a capability packet (CAP) to the wireless power receiver 1020 (S1304).

FIG. 16 is a diagram illustrating a message field of a capability packet (CAP) of a wireless power transmitter according to an embodiment.

A capability packet (CAP) according to an embodiment may have a header value of 0x31, and referring to FIG. 16, may include a message field of 3 bytes.

Referring to FIG. 16, a 1-bit authentication (AR) flag and a 1-bit out-of-band (OB) flag may be included in the message field of the capability packet (CAP).

The authentication flag AR indicates whether the wireless power transmitter 1010 supports the authentication function. For example, if the value of the authentication flag AR is '1', it indicates that the wireless power transmitter 1010 supports an authentication function or can operate as an authentication responder, if the value of the authentication flag AR is '0', it may indicate that the wireless power transmitter 1010 does not support the authentication function or cannot operate as an authentication responder.

The out-band (OB) flag indicates whether the wireless power transmitter 1010 supports out-band communication. For example, if the value of the out-band (OB) flag is '1', the wireless power transmitter 1010 instructs out-band communication, if the value of the out-band (OB) flag is '0', it may indicate that the wireless power transmitter 1010 does not support out-band communication.

In addition, a message field of a capability packet (CAP) may include information on elements for negotiation of a power transfer contract. Referring to FIG. 16, in the message field of capability packet (CAP), information on elements for negotiation of a power transfer contract, such as negotiable load power and potential load power, may be included.

The value included in the Negotiable Load Power field is information related to power negotiable by the wireless power transmitter 1010, it can be set as potential load power ($P_L^{(neg)}$)/0.5 W. The potential load power $P_L^{(neg)}$ may have a value less than or equal to the potential load power $P_L^{(pot)}$ described below.

A value included in the potential load power field is information related to the maximum wireless power negotiable by the wireless power transmitter 1010, and may be set to potential load power ($P_L^{(pot)}$/0.5 W.

In the negotiation phase, the wireless power receiver 1020 receives a capability packet (CAP) of the wireless power transmitter 1010, it is possible to check whether the wireless power transmitter 1010 supports an authentication function, supports out-of-band communication, and the like.

Referring back to FIG. 15, in the negotiation phase or re-negotiation phase, the wireless power receiver 1020 may use at least one specific request packet (SRQ, Specific Request data packet) to update the elements of the Power Transfer Contract related to the power to be provided in the power transfer phase, the negotiation phase or the re-negotiation phase may be ended (S1305).

The wireless power transmitter 1010 may transmit only ACK, only ACK or NAK, or only ACK or ND in response to the specific request packet SRQ according to the type of the specific request packet SRQ (S1306).

In the above-described ping phase, configuration phase, and negotiation/renegotiation phase, a data packet or message exchanged between the wireless power transmitter

1010 and the wireless power receiver 1020 may be transmitted/received through in-band communication.

In the power transfer phase, the wireless power transmitter 1010 and the wireless power receiver 1020 may transmit/receive wireless power based on a power transfer contract established in a negotiation phase or a re-negotiation phase. The wireless power transmitter 1010 and the wireless power receiver 1020 can control the amount of power transmitted by performing communication together with power transmission/reception.

In the power transfer phase, the wireless power transmitter 1010 and/or the wireless power receiver 1020 may re-enter the negotiation phase to renew a power transfer contract.

Other details of the ping phase, the configuration phase, and the negotiation phase have been described with reference to FIGS. 5 and 11, and thus additional description thereof will be omitted.

The wireless power transmitter 1010 performs foreign object detection before a power transfer phase, for example, in a ping phase and a negotiation phase, and also performs foreign object detection in a power transfer phase.

A foreign object present between the wireless power transmitter 1010 and the wireless power receiver 1020 not only reduces the transmission efficiency of wireless power, but also may cause a fire due to heat generated by the foreign object by wireless power.

Accordingly, in the power transfer phase, the wireless power transmitter 1010 checks the power leakage by the foreign object to determine the possibility of the existence of the foreign object based on the received power value included in the received power packet (RP) received from the wireless power receiver 1020.

Meanwhile, the alignment state between the primary coil of the wireless power transmitter 1010 and the secondary coil of the wireless power receiver 1020 also affects the transmission efficiency of wireless power.

When the primary and secondary coils are misaligned, since the transmission efficiency of the wireless power is lowered, the wireless power received by the wireless power receiver 1020 is lower than the wireless power transmitted by the wireless power transmitter 1010.

Therefore, it is difficult for the wireless power transmitter 1010 to accurately determine whether the power leakage is due to a foreign object or misalignment only with the received power value included in the received power packet RP.

Figure 17:
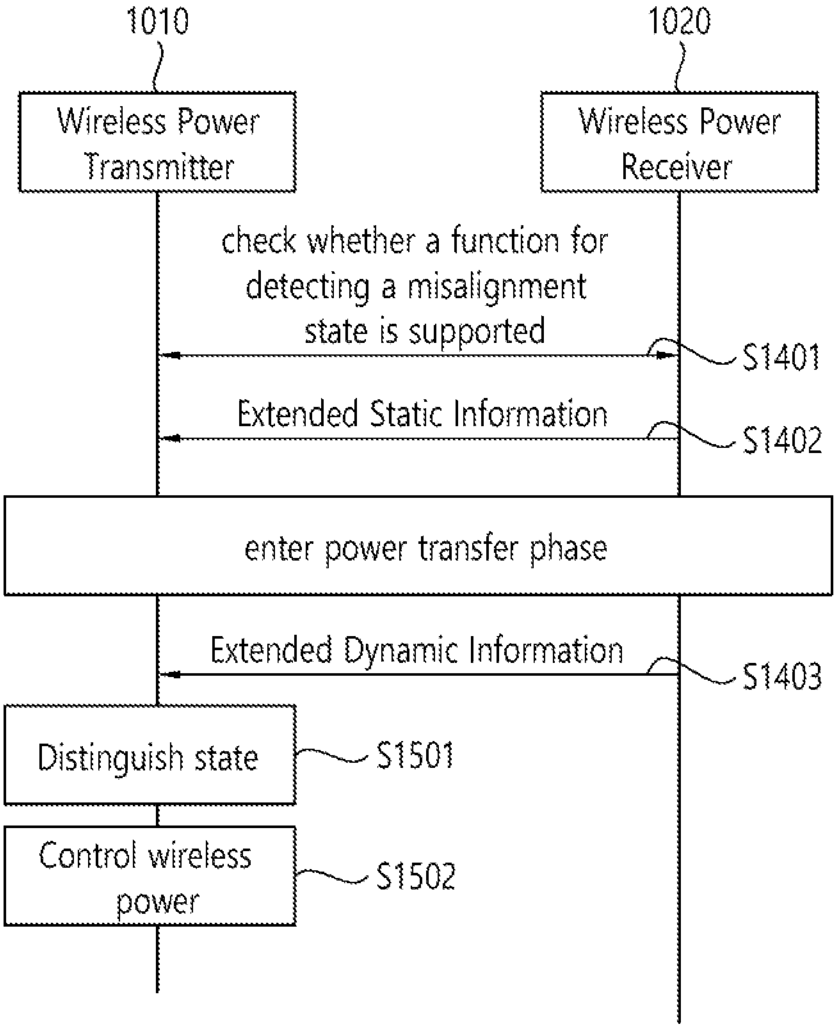
FIG. 17 is a flowchart illustrating a method of distinguishing a misalignment state and a foreign object existence state according to an exemplary embodiment.

FIG. 17 is a flowchart illustrating a method of distinguishing a misalignment state and a foreign object existence state according to an exemplary embodiment.

The wireless power transmitter 1010 and the wireless power receiver 1020 may check whether a function for detecting a misalignment state is supported (S1401).

For example, the wireless power receiver 1020 may include information on whether a misalignment detection function is supported in the configuration packet (CFG) and transmit the configuration packet (CFG) to the wireless power transmitter 1010. Alternatively, the wireless power receiver 1020 may transmit information on whether the misalignment detection function is supported to the wireless power transmitter 1010 in a separate packet.

The wireless power receiver 1020 may transmit information on what kind of information can be provided as information helpful for the wireless power transmitter 1010 to detect a misalignment state (or distinguish a misalignment state from a foreign object existence state) to the wireless power transmitter 1010.

The wireless power transmitter 1010 may include information on whether the misalignment state detection function is supported in the capability packet (CAP) and transmit it to the wireless power receiver 1020. Alternatively, the wireless power transmitter 1010 may transmit information on whether the misalignment detection function is supported to the wireless power receiver 1020 in a separate packet.

The wireless power transmitter 1010 may transmit, to the wireless power receiver 1020, information about what information is required to detect a misalignment state (or distinguish a misalignment state from a foreign object presence state). In addition, the wireless power transmitter 1010 may transmit information about which algorithm is used to detect a misalignment state (or distinguish a misalignment state from a foreign object existence state) to the wireless power receiver 1020. The wireless power transmitter 1010 may transmit, to the wireless power receiver 1020, information on a level at which a misalignment state and/or a possibility of a foreign object can be distinguished.

The wireless power transmitter 1010 and the wireless power receiver 1020 may transmit/receive information for checking whether the misalignment detection function is supported using in-band communication or out-band communication.

The wireless power receiver 1020 may transmit extended static information to the wireless power transmitter 1010 (S1402).

The wireless power receiver 1020 may proceed to step S1402 when support for the function to detect the misalignment between the wireless power transmitter 1010 and the wireless power receiver 1020 is confirmed in step S1401.

Extended static information may be information that does not change during power transmission among information other than basic information. The basic information may mean, for example, essential information used in a wireless power transmission protocol or essential information used in a protocol according to BPP.

Extended static information may include, for example, information related to the type, size, inductance, etc. of the secondary coil, or may include information related to capacitance, inductance, resistance, and the like of the power pickup circuit of the wireless power receiver 1020. Secondary coil type information may be information about the type of secondary coil defined in the Qi standard.

Referring to FIG. 17, the wireless power receiver 1020 may transmit extended static information before the power transfer phase. For example, the wireless power receiver 1020 may transmit extended static information to the wireless power transmitter 1010 in a configuration phase or a negotiation phase.

Alternatively, unlike the embodiment shown in FIG. 17, the wireless power receiver 1020 may transmit extended static information in a power transfer phase.

The wireless power receiver 1020 may transmit/receive the extended static information using in-band communication or out-band communication.

The wireless power receiver 1020 may transmit extended static information in a manner such as transmitting extended static information stored in its own memory, transmitting the extended static information to the wireless power transmitter 1010 by connecting to a separate server where its extended static information is stored, or delivering a URL, etc. that can check its extended static information to the wireless power transmitter 1010, etc.

The wireless power receiver 1020 may transmit extended dynamic information to the wireless power transmitter 1010 (S1403).

The wireless power receiver 1020 may transmit expanded dynamic information to the wireless power transmitter 1010 in the power transfer phase. The wireless power receiver 1020 may transmit/receive the extended dynamic information using in-band communication or out-band communication.

The extended dynamic information may be information that varies during power transmission among information other than basic information. The extended dynamic information may include, for example, information related to the state of the load (e.g., a battery charged with the received wireless power) of the wireless power receiver 1020, or information related to the location information of the secondary coil or wireless power receiver 1020, etc. The load state information may include information about the charge amount, temperature, and the like of the load. The location information may include received signal strength indication (RSSI), angle information based on multiple antennas, or measurement values of a gyro sensor and/or an acceleration sensor included in the wireless power receiver 1020. RSSI may be RSSI of BLE communication between the wireless power transmitter 1010 and the wireless power receiver 1020.

If power leakage is detected based on the received power value included in the received power packet, and there is a possibility of foreign object existence or misalignment, the wireless power transmitter 1010 may distinguish a foreign object existence state and a misalignment state from each other based on the expanded static information and the expanded dynamic information (S1501).

The wireless power transmitter 1010 may calculate an expected mutual inductance between the primary coil and the secondary coil based on the extended static information. The expected mutual inductance may be an expected mutual inductance value in a state in which the primary coil and the secondary coil are accurately aligned.

The wireless power transmitter 1010 may measure or calculate the actual mutual inductance between the primary coil and the secondary coil based on the extended dynamic information.

Mutual inductance shows a negative correlation with frequency in the presence of a foreign object, but shows a positive correlation with frequency in the misalignment state.

Accordingly, the wireless power transmitter 1010 may distinguish between a foreign object presence state and a misalignment state based on a difference between expected mutual inductance and actual mutual inductance.

Or, based on extended static information, the wireless power transmitter 1010 may measure or calculate the relative position or relative position change of the secondary coil or the wireless power receiver 1020 with respect to the wireless power transmitter 1010.

For example, using RSSI, angle information based on multiple antennas, or measurement values from gyro sensors and/or acceleration sensors, the position/positional change of the secondary coil or the wireless power receiver 1020 may be measured or calculated.

The extended dynamic information may be continuously transmitted at short intervals (e.g., 7.5 ms or less) so that the wireless power transmitter 1010 more accurately determines the position change of the wireless power receiver 1020.

The wireless power transmitter 1010 calculates the amount of position change of the wireless power receiver 1020 based on the continuously transmitted extended dynamic information, when a change in position of the wireless power receiver 1020 is also detected along with power leakage, it is determined as a misalignment state, when power leakage is detected but there is no change in position of the wireless power receiver 1020, it may be determined that a foreign object exists state.

In addition, the wireless power transmitter 1010 may perform machine learning to distinguish between a misalignment state and a foreign object presence state. The wireless power transmitter 1010 may perform machine learning by accessing a server storing a learning file for distinguishing a misalignment state and a foreign object presence state, or obtain a learning result from the wireless power receiver 1020.

The wireless power transmitter 1010 may control the transmitted wireless power based on the state determined in step S1501 (S1502).

When it is determined that the foreign object exists in step S1501, the wireless power transmitter 1010 may lower the transmitted wireless power to 5 W or less or stop transmitting the wireless power. For example, the wireless power transmitter 1010 stops transmitting wireless power when it is determined that the possibility of foreign object existence is equal to or greater than a certain level, if the possibility of foreign object existence is determined to be below a certain level, the wireless power may be lowered to equal to or less than 5 W and transmitted.

If it is determined to be misaligned in step S1501, the wireless power transmitter 1010 may control transmitted wireless power or stop transmission of the wireless power so that the wireless power receiver 1020 can receive wireless power of a desired power level.

For example, if it is judged that the degree of misalignment is not out of a certain range, the wireless power transmitter 1010 may adjust the amount and/or frequency of transmitted wireless power so that the wireless power receiver 1020 can receive wireless power of a desired power level. In this case, the wireless power transmitter 1010 may control the transmitted wireless power based on the control error packet (CE) received from the wireless power receiver 1020.

Meanwhile, the wireless power transmitter 1010 may stop transmitting wireless power when it is determined that the degree of misalignment is out of a predetermined range. If the degree of misalignment is out of a certain range, when the wireless power receiver 1020 increases the transmission power so that the wireless power of the desired power level can be received, this is because a fire or damage to a circuit of the wireless power transmitter 1010 may occur due to heat generated by the wireless power transmitter 1010.

As described above, the wireless power transmitter 1010 and the wireless power receiver 1020 according to an embodiment of the present specification enable the wireless power transmitter 1010 to distinguish between a misalignment state and a foreign object existence state, since wireless power can be controlled according to each state, more effective transmission/reception of wireless power is possible.

For example, when a misalignment state and a foreign object presence state cannot be distinguished, when a power leakage is found, the wireless power transmitter reduces transmission power or stops power transmission. However, according to an embodiment of the present specification, if the power leakage is due to misalignment and the misalignment does not exceed a certain range, the wireless charging state may be maintained through power control such as increasing transmission power.

Figure 18:
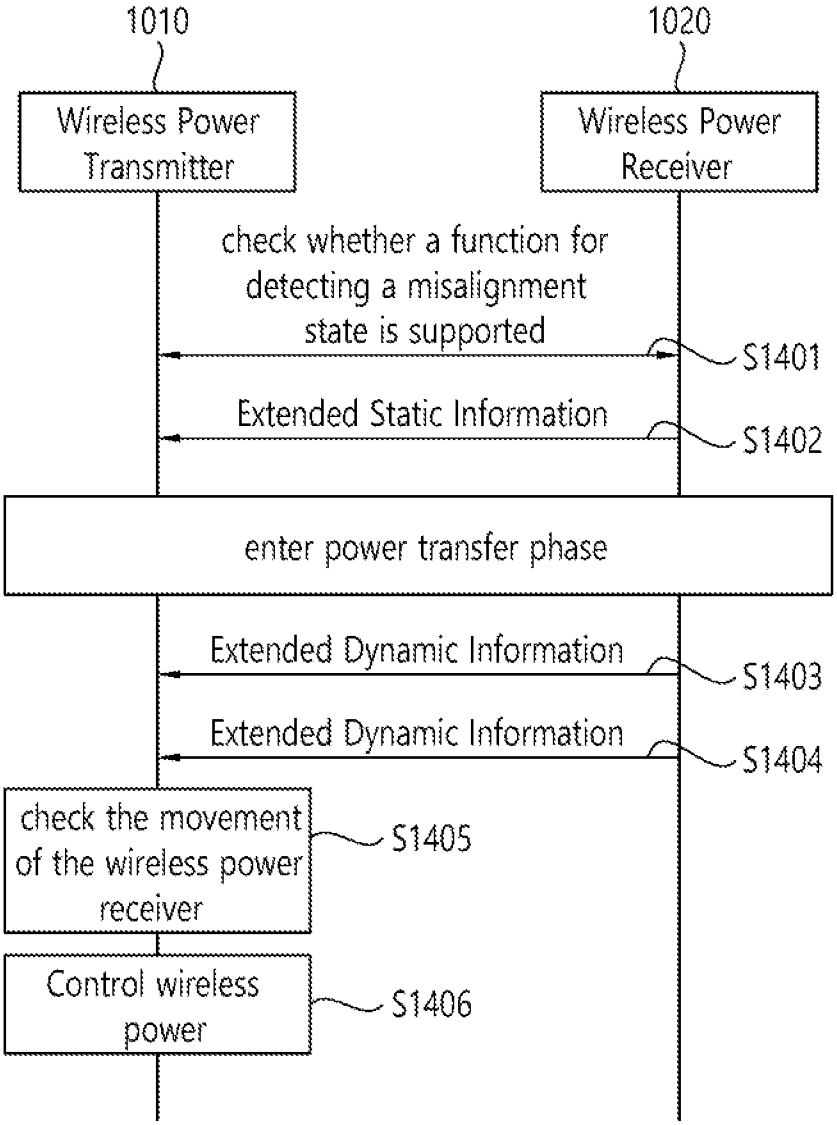
FIG. 18 is a flowchart illustrating a method of distinguishing a misalignment state and a foreign object existence state according to another embodiment.

FIG. 18 is a flowchart illustrating a method of distinguishing a misalignment state and a foreign object existence state according to another embodiment.

Steps S1401 to S1403 are the same as or similar to the embodiment described with reference to FIG. 17, so additional description thereof will be omitted.

Referring to FIG. 18, the wireless power receiver 1020 repeatedly transmits expanded dynamic information to the wireless power transmitter 1010 (S1403 and S1404).

The wireless power transmitter 1010 may check the movement of the wireless power receiver 1020 at regular unit time intervals based on the repeatedly transmitted extended dynamic information (S1405).

Based on RSSI, angle information based on multiple antennas, or measurements from gyro sensors and/or acceleration sensors, etc. included in the extended dynamic information transmitted repeatedly, the wireless power transmitter 1010 may determine the movement of the wireless power receiver 1020.

The wireless power transmitter 1010 may control the transmitted wireless power based on the movement of the wireless power receiver 1020 (S1406).

For example, the wireless power transmitter 1010 checks whether the movement of the wireless power receiver 1020 occurs at unit time intervals, and if the movement of the wireless power receiver 1020 occurs within the unit time, transmitted wireless power may be limited to a preset level. In a situation where the wireless power receiver 1020 is moving, since misalignment continuously occurs and the degree of misalignment continues to change, this is because controlling the wireless power according to the movement of the wireless power receiver 1020 is inefficient.

In addition, when the motion of the wireless power receiver 1020 is maintained beyond a predetermined time, the wireless power transmitter 1010 may temporarily stop transmitting wireless power. The wireless power transmitter 1010 may resume transmission of wireless power again if the movement of the wireless power receiver 1020 does not occur within a unit time. At this time, the wireless power transmitter 1010 may determine the degree of misalignment with the wireless power receiver 1020 and control the wireless power based on this.

On the other hand, when the use of the wireless power receiver 1020 involves continuous movement, for example, even if the movement of the wireless mouse or the wireless power receiver 1020 is maintained beyond a predetermined time, transmission of wireless power may not be stopped.

Steps S1405 and S1405 may be performed periodically.

When the wireless power transmitter 1010 determines that the movement of the wireless power receiver 1020 has stopped based on the repeatedly transmitted extended dynamic information, steps S1501 and S1502 of FIG. 17 may be performed.

According to the embodiment described with reference to FIG. 18, it is possible to prevent inefficient power control of constantly determining the misalignment state of the moving wireless power receiver 1020 and controlling power according to the continuously changing misalignment state.

Figure 19:
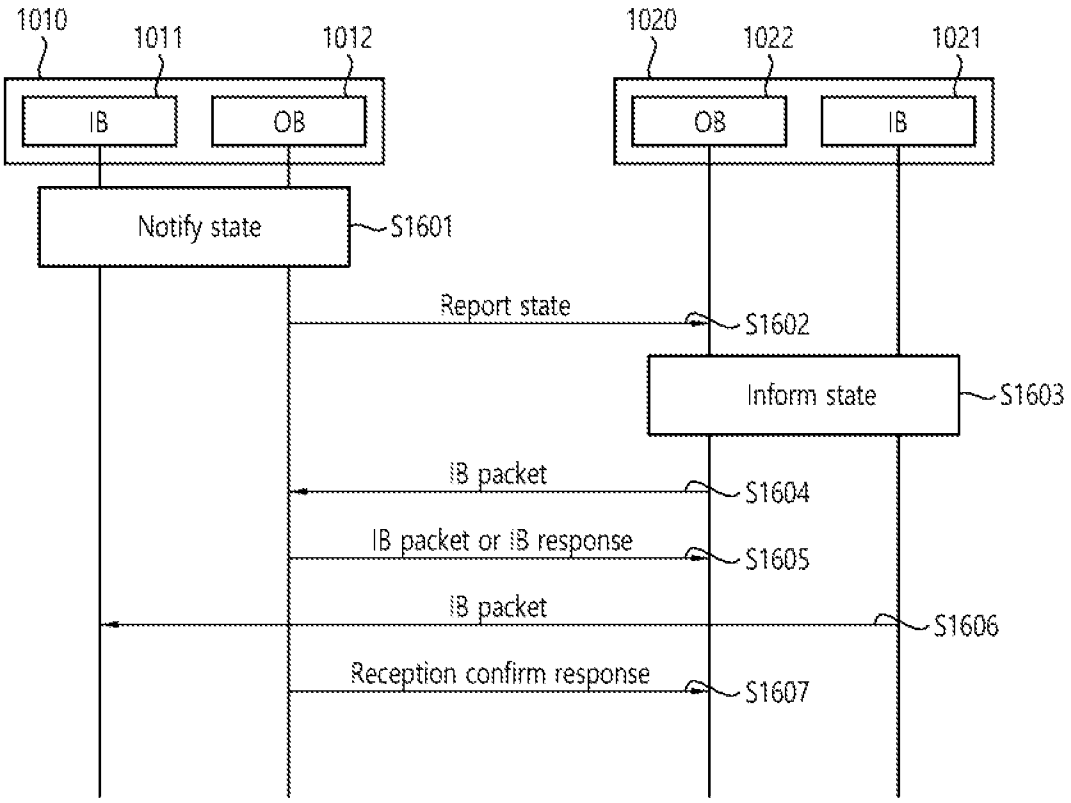
FIG. 19 is a flowchart illustrating a method of providing status notification in a misalignment state and/or a foreign object state according to an exemplary embodiment.

FIG. 19 is a flowchart illustrating a method of providing status notification in a misalignment state and/or a foreign object state according to an exemplary embodiment.

Referring to FIG. 19, a wireless power transmitter 1010 may include an in-band communication module 1011 and an out-band communication module 1012. The in-band communication module 1011 may perform message modulation, message transmission, message demodulation, etc. through in-band communication, the out-band communication module 1012 may perform message modulation, message transmission, and message demodulation through out-band communication. The in-band communication module 1011 and the out-band communication module 1012 may be physically separated from each other, but may be physically implemented by one processor.

The wireless power receiver 1020 may also include an in-band communication module 1021 and an out-band communication module 1022. The in-band communication module 1021 may perform message modulation, message transmission, message demodulation, etc. through in-band communication, the out-band communication module 1022 may perform message modulation, message transmission, and message demodulation through out-band communication. The in-band communication module 1021 and the out-band communication module 1022 may be physically separated from each other, but may be physically implemented by one processor.

Hereinafter, for convenience of explanation, it is assumed that both the wireless power transmitter 1010 and the wireless power receiver 1020 support out-of-band communication and use BLE communication as out-of-band communication.

As described in step S1501, the wireless power transmitter 1010 may distinguish between a misalignment state and a foreign object existence state.

When the wireless power transmitter 1010 detects a misalignment state and/or a foreign object presence state, it may provide a notification of the state to the user (S1601).

The wireless power transmitter 1010 may provide a notification to the user using, for example, a display, sound, LED, or the like. In order for the user to easily understand the intention of the notification, the notification can be provided by distinguishing between the misalignment state and the foreign object existence state. If a notification that a foreign object exists is provided, the user can remove the foreign object, and if a notification about misalignment is provided, the user can rearrange the wireless power transmitter 1010 and/or the wireless power receiver 1020.

Meanwhile, when the wireless power transmitter 1010 detects a misalignment state and/or a foreign object existence state, it may provide a status report message including information on the detected state to the wireless power receiver 1020 (S1602).

Since in-band communication may not be smooth in a misalignment state, the status report message may be transmitted using out-band communication. Status reporting messages can be structured to distinguish between misalignment conditions and foreign object presence conditions. For example, the status report message may indicate a misalignment state or a foreign object existence state according to a payload value.

The wireless power receiver 1020 receiving the status report message may provide a user with a notification of the corresponding state (S1603).

The wireless power receiver 1020 may provide a notification to the user using, for example, a display, sound, LED, or the like. In order for the user to easily understand the intention of the notification, the notification can be provided by distinguishing between the misalignment state and the foreign object existence state. If a notification that a foreign object exists is provided, the user can remove the foreign object, and if a notification about misalignment is provided, the user can rearrange the wireless power transmitter 1010 and/or the wireless power receiver 1020.

After the wireless power transmitter 1010 detects a misalignment state or a foreign object presence state, for example, after receiving a status report message from the wireless power transmitter 1010, the wireless power receiver 1020 may transmit an IB packet (e.g., CE, RP, etc.) transmitted through in-band communication through out-band communication (S1604).

After the wireless power transmitter 1010 also detects a misalignment state or a foreign object existence state, it may transmit IB packets (e.g. ADC (Auxiliary Data Control data packet), ADT (Auxiliary Data Transport data packet)) or IB responses (e.g., ACK, NAK, ATN, ND) transmitted through in-band communication through out-band communication (S1605).

This is because in-band communication may not be smooth in a misalignment state, and in-band communication may be distorted by a foreign object even in a state in which a foreign object exists.

Meanwhile, the wireless power receiver 1020 may transmit an IB packet to the wireless power transmitter 1010 using in-band communication to check the in-band communication state (S1606).

The wireless power transmitter 1010 receiving the IB packet may transmit an acknowledgment response message indicating that the IB packet has been normally received to the wireless power receiver 1020 using out-of-band communication (S1607). Alternatively, the wireless power transmitter 1010 may transmit a response pattern or an acknowledgment response message indicating that the IB packet has been normally received to the wireless power receiver 1020 using in-band communication.

The wireless power receiver 1020 receiving the response pattern indicating that the reception confirmation response message or IB packet was normally received from the wireless power transmitter 1010 may resume communication with the wireless power transmitter 1010 using in-band communication.

On the other hand, when an error occurs in the connection process of out-of-band communication between the wireless power transmitter 1010 and the wireless power receiver 1020, the occurrence of an error can be transmitted to the counterpart device using in-band communication. If an error occurs in the connection process of out-of-band communication, since out-of-band communication has not been established yet, the wireless power transmitter 1010 and the wireless power receiver 1020 cannot transmit or receive the occurrence of an error using out-of-band communication. Since the wireless power transmitter 1010 and the wireless power receiver 1020 can use in-band communication, the occurrence of an error in the connection process of out-band communication is notified to the counterpart device through in-band communication, so that the connection process of out-band communication can be restarted.

Figure 20:
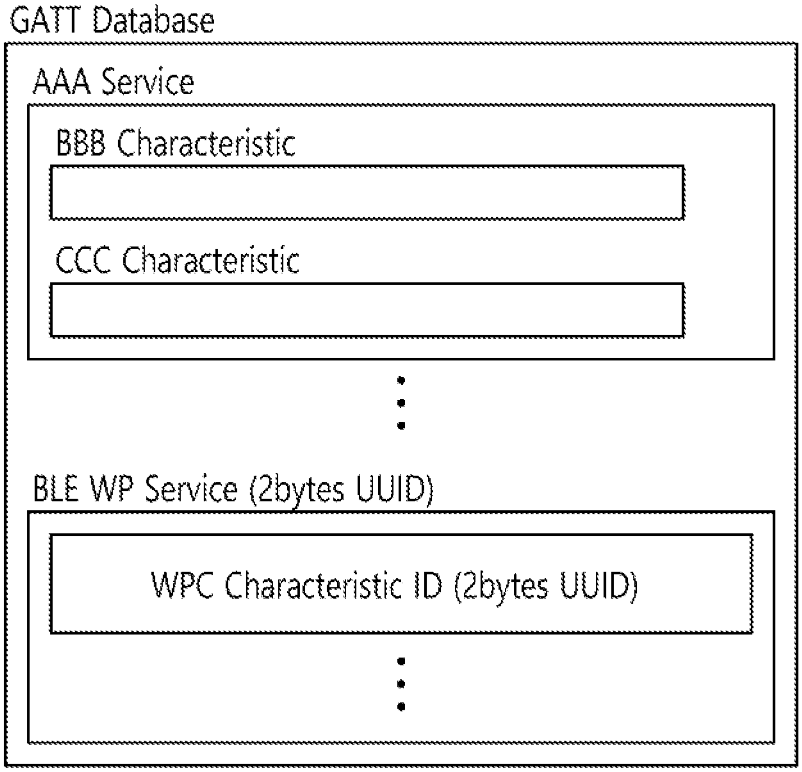
FIG. 20 is a diagram illustrating a GATT database including wireless charging related services according to an embodiment.

FIG. 20 is a diagram illustrating a GATT database including wireless charging related services according to an embodiment.

The wireless power transmitter 1010 and the wireless power receiver 1020 may communicate with each other using in-band communication and/or out-band communication.

When Bluetooth Low Energy (BLE) is used for out-of-band communication, the wireless power receiver 1020 may function as an advertiser and the wireless power transmitter 1010 may operate as a scanner. In the service discovery procedure, the wireless power transmitter 1010 may check services of the GATT database of the wireless power receiver 1020.

A process in which the wireless power transmitter 1010 checks all services of the GATT database of the wireless power receiver 1020 takes approximately several seconds.

So that the wireless power transmitter 1010 can quickly provide BLE services related to wireless charging, the wireless power receiver 1020 may be configured to include a UUID having a high priority in a wireless charging related service (BLE WP Service) among services of the GATT database. In this case, in the process of checking the services of the GATT database of the wireless power receiver 1020, the wireless power transmitter 1010 may first check a service including a UUID having a high priority and provide the corresponding service.

The wireless power receiver 1020 may transmit information about a service having a high priority to the wireless power transmitter 1010 in advance through advertising. For example, the wireless power receiver 1020 may transmit information about a UUID of a service having a high priority to the wireless power transmitter 1010 in advance through advertising.

Alternatively, the wireless power receiver 1020 may request the wireless power transmitter 1010 whether to omit the service discovery procedure through advertising. If the wireless power transmitter 1010 agrees to omit the service discovery procedure, the wireless power transmitter 1010 and the wireless power receiver 1020 may omit a service discovery procedure and quickly establish a BLE connection.

Figure 21:
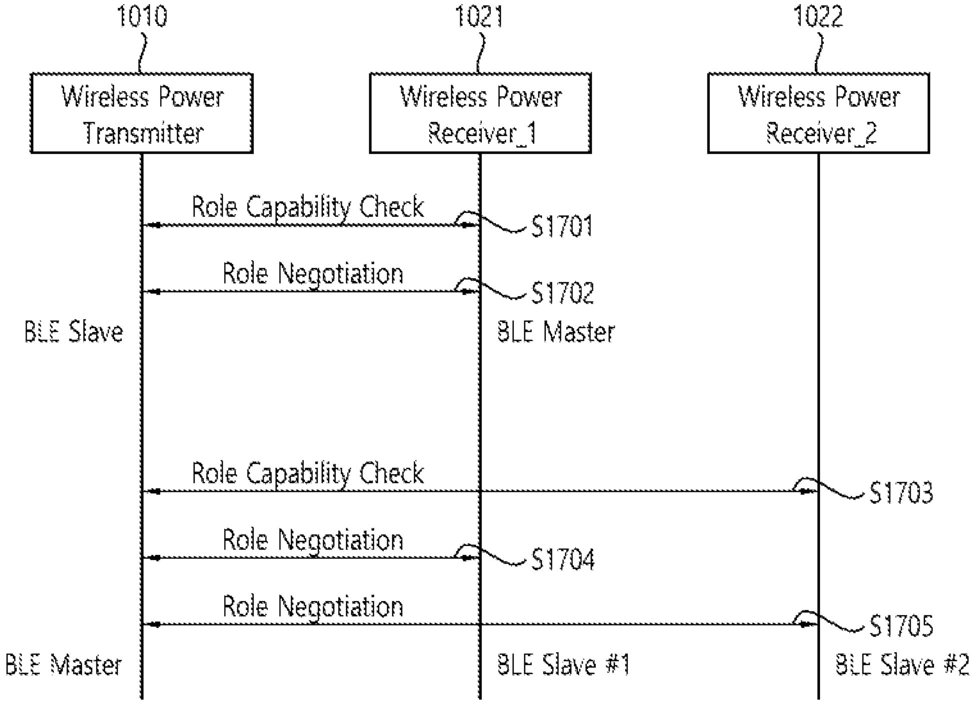
FIG. 21 is a flowchart for explaining a method for changing roles of a wireless power transmitter and a wireless power receiver in BLE according to an embodiment.

FIG. 21 is a flowchart for explaining a method for changing roles of a wireless power transmitter and a wireless power receiver in BLE according to an embodiment.

Referring to FIG. 21, the wireless power transmitter 1010 is capable of simultaneous BLE connection with a plurality of wireless power receivers 1021 and 1022. In addition, the wireless power transmitter 1010 may simultaneously provide wireless power to a plurality of wireless power receivers 1021 and 1022.

According to this embodiment, the wireless power transmitter 1010 and the wireless power receiver 1020 have variable roles (Advertiser, Scanner, Initiator, Slave, GATT Server, etc.) in BLE communication.

Referring to FIG. 21, the wireless power transmitter 1010 starts a wireless charging protocol with the first wireless power receiver 1021, a message confirming the role capability may be exchanged with the first wireless power receiver 1021 (S1701).

In step S1701, the wireless power transmitter 1010 and the first wireless power receiver 1021 may exchange information on roles that can be performed in BLE communication through in-band communication. This process can be performed in the configuration phase and/or negotiation phase.

Based on the information confirmed in step S1701, the wireless power transmitter 1010 and the first wireless power receiver 1021 may negotiate roles to be played in BLE communication (S1702). Each device 1010 or 1021 may negotiate a role in consideration of its own power supply method, connection status with other devices, applications, and the like. Messages for negotiation can be exchanged through in-band communication. Step S1702 may be performed in the negotiation phase.

Referring to FIG. 21, it is assumed that the wireless power transmitter 1010 operates as a slave and the first wireless power receiver 1021 operates as a master.

Then, the second wireless power receiver 1022 is mounted on the wireless power transmitter 1010, and the wireless power transmitter 1010 performs a wireless charging protocol with the second wireless power receiver 1022.

Since the wireless power transmitter 1010 already operates as a slave in relation to the first wireless power receiver 1021, BLE communication with each of the wireless power receivers 1021 and 1022 cannot be performed smoothly.

Therefore, the wireless power transmitter 1010 exchanges a message confirming the role capability with the second wireless power receiver 1022 (S1703), each of the first wireless power receiver 1021 and the second wireless power receiver 1022 may negotiate a role to perform in BLE communication (S1704 and S1705).

For smooth BLE communication with the first wireless power receiver 1021 and the second wireless power receiver 1022, the wireless power transmitter 1010 may operate as a master and negotiate so that the first wireless power receiver 1021 and the second wireless power receiver 1022 operate as slaves, respectively.

According to this embodiment, since the wireless power transmitter 1010 and the wireless power receivers 1021 and 1022 can actively negotiate roles in BLE according to circumstances, an effective communication state can be maintained according to circumstances.

The wireless power transmitter in the embodiment according to the above-described FIGS. 12 to 21 corresponds to the wireless power transmission apparatus or the wireless power transmitter or the power transmission unit disclosed in FIGS. 1 to 11. Accordingly, the operation of the wireless power transmitter in this embodiment is implemented by one or the same or more than two combinations of each component of the wireless power transmitter in FIGS. 1 to 11. For example, reception/transmission of a message or data packet according to FIGS. 12 to 21 is included in the operation of the communication/control unit 120, 710 or 790.

The wireless power receiving apparatus in the embodiment according to the above-described FIGS. 12 to 21 corresponds to the wireless power receiving apparatus or the wireless power receiver or the power receiving unit disclosed in FIGS. 1 to 11. Accordingly, the operation of the wireless power receiver in this embodiment is implemented by one or the same or a combination of two or more of the respective components of the wireless power receiver in FIGS. 1 to 11. For example, reception/transmission of a message or data packet according to FIGS. 12 to 21 may be included in the operation of the communication/control unit 220, 810, or 890.

Since all components or steps are not essential for the wireless power transmission method and apparatus, or the reception apparatus and method according to the embodiment of the present document described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each of the above-described components or steps is not necessarily performed in the order described, and it is also possible that the steps described later are performed before the steps described earlier.

The above description is merely illustrative of the technical idea of the present document, those of ordinary skill in the art to which the present document pertains will be able to make various modifications and variations without departing from the essential characteristics of the present document. Accordingly, the embodiments of the present document described above may be implemented separately or in combination with each other.

Accordingly, the embodiments disclosed in the present document are not intended to limit the technical spirit of the present document, but to explain, and the scope of the technical spirit of the present document is not limited by these embodiments. The protection scope of the present document should be construed by the following claims, all technical ideas within the scope equivalent thereto should be construed as being included in the scope of the present document.

What is claimed is:

1. A wireless power transmitter, which transmits a wireless power to a wireless power receiver, comprising:

a power converter including a primary coil that is magnetically coupled to a secondary coil of the wireless power receiver and transmits the wireless power; and a controller configured to communicate with the wireless power receiver and control the transmission of the wireless power, wherein the controller is configured to:

receive first information related to the secondary coil from the wireless power receiver, receive second information related to location information of the wireless power receiver from the wireless power receiver, wherein the second information includes a measurement value of a gyro sensor or an acceleration sensor included in the wireless power receiver, and distinguish a foreign object state in which a foreign object exists between the wireless power receiver and the wireless power transmitter and a misalignment state between the primary coil and the secondary coil, by:

determining the foreign object state based on the first information, and determining the misalignment state based on the second information.

2. The wireless power transmitter of claim 1, wherein the first information includes information related to a size and an inductance of the secondary coil.

3. The wireless power transmitter of claim 1, wherein the second information includes information related to a received signal strength indication (RSSI) of Bluetooth communication between the wireless power transmitter and the wireless power receiver.

4. The wireless power transmitter of claim 1, wherein the second information is repeatedly received within a predetermined time interval.

5. The wireless power transmitter of claim 1, wherein the controller is configured to:

check a movement of the wireless power receiver at an interval of unit time based on the second information, limit the wireless power to a preset level when the movement of the wireless power receiver is confirmed within the unit time.

6. The wireless power transmitter of claim 1, wherein the controller is configured to:

communicate with the wireless power transmitter using at least one of in-band communication using an operating frequency of the wireless power and out-of-band out-band communication using a frequency other than the operating frequency, wherein at least one of the first information and the second information is received using the out-of-band communication.

7. The wireless power transmitter of claim 1, wherein the controller is configured to:

the second information further including information related to at least one of charge amount and temperature of a battery of the wireless power receiver.

8. The wireless power transmitter of claim 1, wherein the controller is configured to:

determine a possibility of existence of the foreign object, control at least one of power amount and frequency of the wireless power, or stop the transmission of the wireless power, based on the determined possibility of the existence of the foreign object.

9. The wireless power transmitter of claim 1, wherein the controller is configured to:

control at least one of power amount and frequency of the wireless power, or stop the transmission of the wireless power, based on the misalignment state of the primary coil and the secondary coil.

10. A method for transmitting wireless power to a wireless power receiver, the method performed by a wireless power transmitter and comprising:

wherein the wireless power transmitter includes a primary coil that is magnetically coupled to a secondary coil of the wireless power receiver and transmits the wireless power, receiving first information related to the secondary coil from the wireless power receiver;

receiving second information related to a location change of the wireless power receiver from the wireless power receiver, wherein the second information includes a measurement value of a gyro sensor or an acceleration sensor included in the wireless power receiver; and distinguishing a foreign object state in which a foreign object exists between the wireless power receiver and the wireless power transmitter and a misalignment state between the primary coil and the secondary coil by:

determining the foreign object state based on the first information, and determining the misalignment state based on the second information.

11. The method of claim 10, wherein the first information includes information related to a size and an inductance of the secondary coil.

12. The method of claim 10, wherein the second information includes information related to a received signal strength indication (RSSI) of Bluetooth communication between the wireless power transmitter and the wireless power receiver.

13. The method of claim 10, wherein the second information is repeatedly received within a predetermined time interval.

14. The method of claim 10, wherein the method comprises:

checking a movement of the wireless power receiver at an interval of unit time based on the second information, limiting the wireless power to a preset level when the movement of the wireless power receiver is confirmed within the unit time.

15. The method of claim 10, wherein the wireless power transmitter communicates with the wireless power transmitter using at least one of in-band communication using an operating frequency of the wireless power and out-of-band communication using a frequency other than the operating frequency, wherein at least one of the first information and the second information is received using the out-of-band communication.

16. The method of claim 10, wherein the second information further includes information related to at least one of charge amount and temperature of a battery of the wireless power receiver.

17. The method of claim 10, wherein the method comprises:

determining a possibility of existence of the foreign object, controlling at least one of power amount and frequency of the wireless power, or stopping the transmission of the wireless power, based on the determined possibility of the existence of the foreign object.

18. The method of claim 10, wherein the method comprises:

controlling at least one of power amount and frequency of the wireless power, or stopping the transmission of the wireless power, based on the misalignment state of the primary coil and the secondary coil.

* * * * *